United States Patent
Yanai et al.

(10) Patent No.: US 10,972,714 B2
(45) Date of Patent: Apr. 6, 2021

(54) IMAGE PROCESSING APPARATUS, IMAGE PROCESSING METHOD AND STORAGE MEDIUM FOR STORING PROGRAM

(71) Applicant: CANON KABUSHIKI KAISHA, Tokyo (JP)

(72) Inventors: Yumi Yanai, Yokohama (JP); Shinichi Miyazaki, Kawasaki (JP); Yuji Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 16/275,442

(22) Filed: Feb. 14, 2019

(65) Prior Publication Data

US 2019/0253689 A1 Aug. 15, 2019

(30) Foreign Application Priority Data

Feb. 15, 2018 (JP) .............................. JP2018-025348
Jan. 31, 2019 (JP) .............................. JP2019-015988

(51) Int. Cl.
 *G06T 7/571* (2017.01)
 *H04N 13/122* (2018.01)
 *G06T 5/00* (2006.01)

(52) U.S. Cl.
CPC ........... *H04N 13/122* (2018.05); *G06T 5/003* (2013.01); *G06T 7/571* (2017.01); *G06T 2207/10012* (2013.01)

(58) Field of Classification Search
CPC ....... H04N 13/122; G06T 7/571; G06T 5/003; G06T 2207/10012; G06T 2207/10028; G06T 2207/10024; G06T 2207/20012; G06T 5/002; G06T 2207/20081; G06T 2207/20084; G06T 3/4053; G06T 7/50; G06T 19/006; G06T 2207/10148; G06T 2207/10152; G06T 7/579; G06T 2207/10016; G06T 5/20; G06T 5/006; G06T 5/009; G06T 2207/1052; G06T 5/50; G06T 7/0014; G06T 2207/20076; G06T 5/001; G06T 7/11; G06T 7/701; G06T 7/73; G06T 19/20; G06T 2200/04; G06T 2207/20201; G06T 2207/20216; G06T 2207/20221; G06T 7/70; G06T 3/4076;

(Continued)

(56) References Cited

U.S. PATENT DOCUMENTS

2008/0303894 A1* 12/2008 Ernst .................... H04N 13/261
 348/43
2012/0038641 A1* 2/2012 Levantovsky ....... H04N 13/156
 345/424

(Continued)

FOREIGN PATENT DOCUMENTS

JP 2009-251839 A 10/2009

*Primary Examiner* — Nimesh Patel
(74) *Attorney, Agent, or Firm* — Venable LLP

(57) ABSTRACT

Image data of a photographic image is inputted, and based on information related to a distance from a focal plane when capture is performed, the sharpness of an image that the inputted image data represents is controlled. Image data resulting from the sharpness control being performed is outputted. In the sharpness control, the sharpness control amount is set in accordance with the luminance of a peripheral region that neighbors an in-focus region that is determined to be in-focus in the image.

21 Claims, 14 Drawing Sheets

(58) Field of Classification Search
CPC ............... G06T 5/005; G02B 27/0172; G02B 27/0179; G02B 2027/0138; G02B 2027/014; G02B 21/0032; G02B 2027/0178; G02B 27/4205; G02B 2027/011; G02B 2027/0132; G02B 30/52; G02B 26/06; G02B 30/40; G02B 5/0252; G02B 5/0257; G02B 5/20; G02B 5/32; G06F 3/011; G06F 3/013; G06F 1/163; G06F 3/012; G06F 3/017; G06F 1/14; G06F 3/016; G06F 3/0304; G06F 3/0346; G06F 3/0425; G06F 3/147; G06F 3/04815; G06F 1/203; G06F 3/04842; G06F 3/005; G09G 3/00; G09G 3/002; G09G 3/2003; G03H 1/0402; G03H 1/2286; G03H 1/2294; G03H 2001/0423; G03H 2222/18; G03H 2223/14; G03H 2223/23; G03H 2225/33; G06K 9/00604; G06K 9/00389; G06K 9/00671; G06K 9/4652; G06K 9/741; G06K 9/00268; G06K 9/42; G06K 9/4642; G06K 9/469; G06K 9/6215

See application file for complete search history.

(56) References Cited

U.S. PATENT DOCUMENTS

| | | |
|---|---|---|
| 2012/0287308 A1 | 11/2012 | Kojima et al. |
| 2013/0050544 A1* | 2/2013 | Kano .................... H04N 9/045 348/242 |
| 2013/0063571 A1 | 3/2013 | Ishii |
| 2013/0343650 A1* | 12/2013 | Tsutsumi ................. G06T 5/00 382/173 |
| 2014/0098246 A1* | 4/2014 | Yi .......................... H04N 5/232 348/207.1 |
| 2015/0379720 A1* | 12/2015 | Herraez ............... H04N 13/261 348/43 |
| 2016/0065924 A1* | 3/2016 | Yokoyama ......... H04N 5/23212 348/241 |
| 2016/0307368 A1 | 10/2016 | Akeley et al. |
| 2017/0163972 A1 | 6/2017 | Kohler et al. |
| 2017/0230638 A1 | 8/2017 | Wajs et al. |
| 2018/0278915 A1 | 9/2018 | Ogawa et al. |
| 2018/0350043 A1 | 12/2018 | Seely et al. |
| 2019/0253609 A1* | 8/2019 | Miyazaki .................. G06T 7/50 |
| 2019/0253690 A1* | 8/2019 | Yanai .................... H04N 13/139 |
| 2020/0007854 A1 | 1/2020 | Ogawa et al. |
| 2020/0012908 A1* | 1/2020 | Miyazaki ................ G06T 5/003 |
| 2020/0175651 A1 | 6/2020 | Zhang et al. |

* cited by examiner

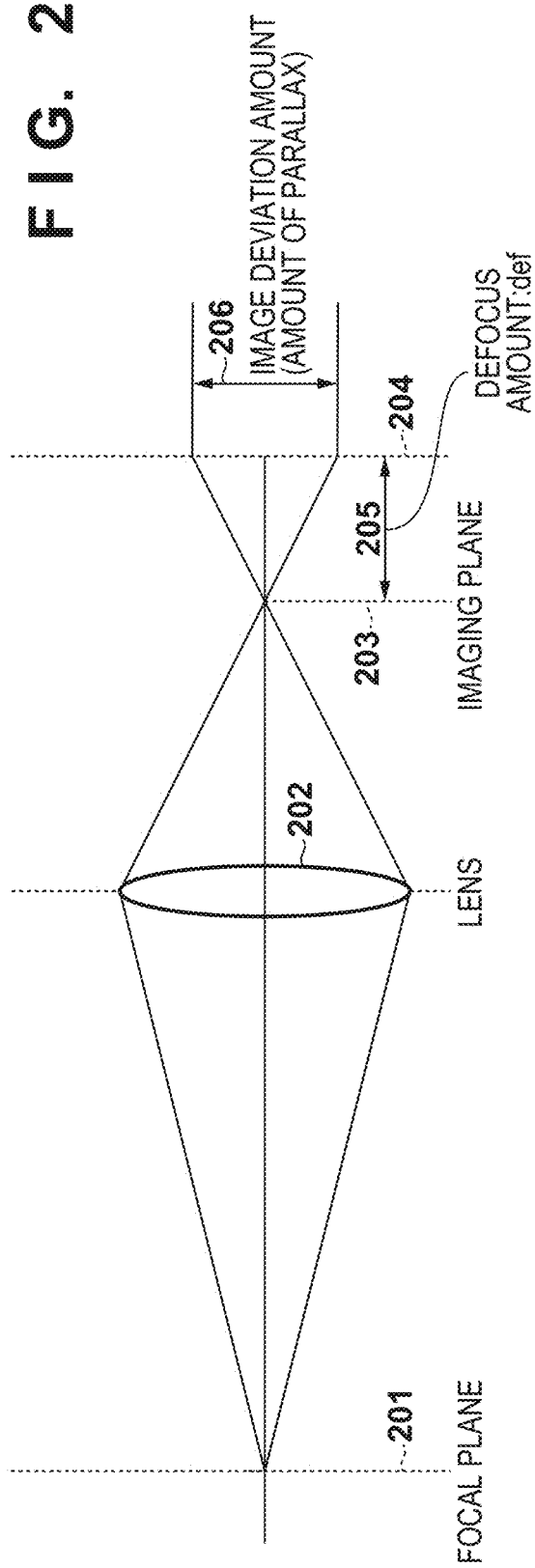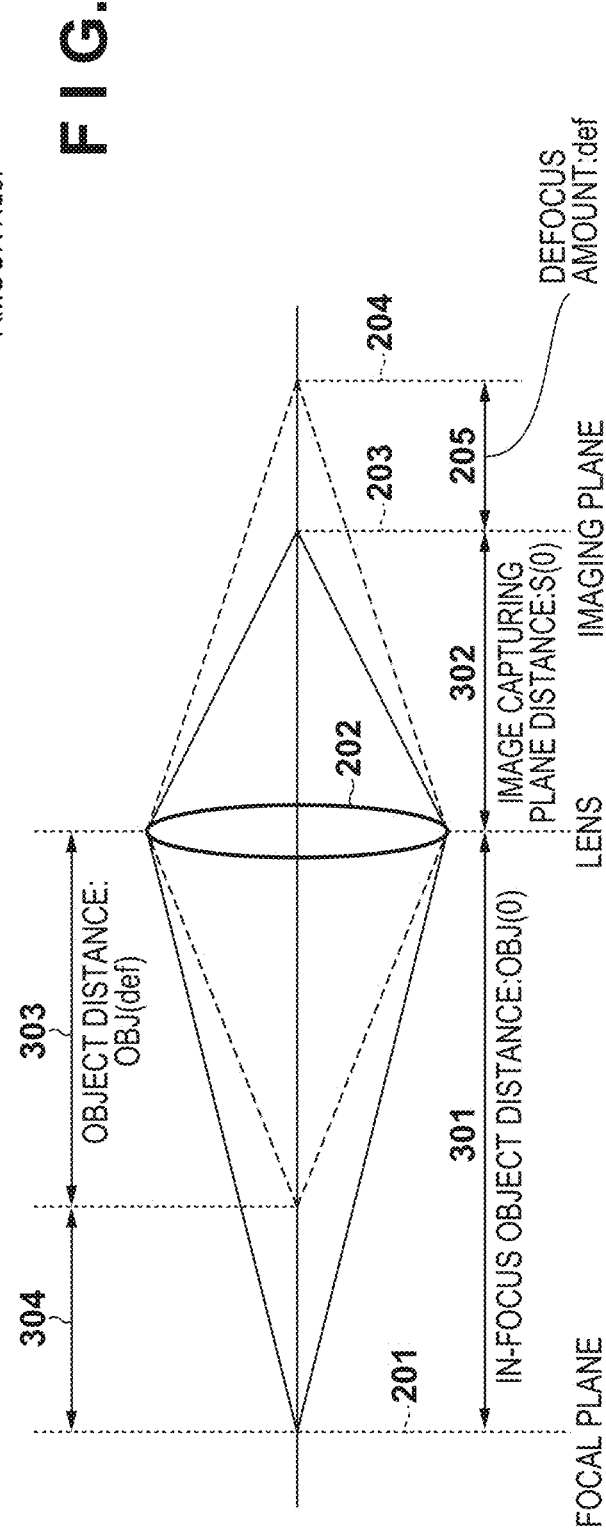

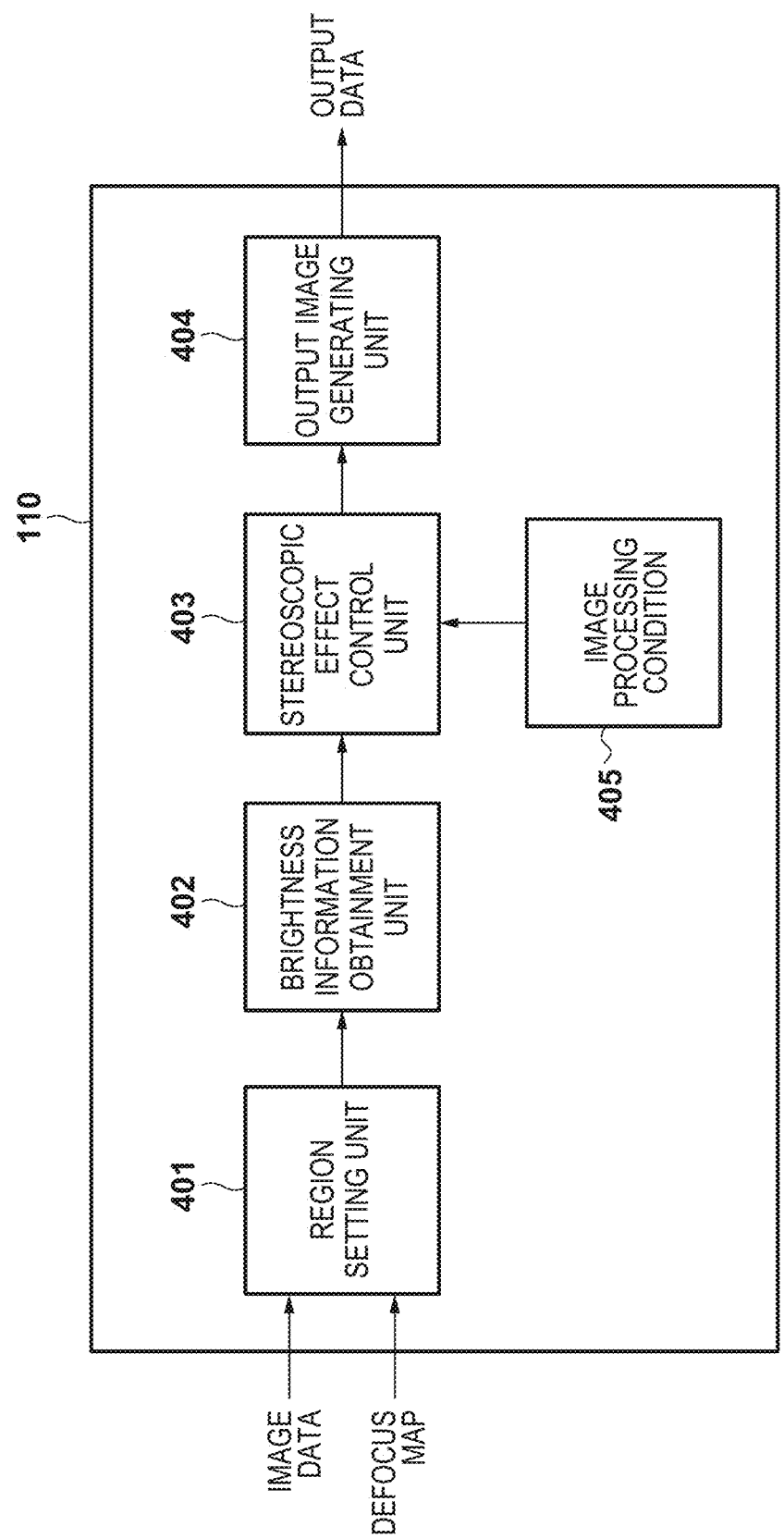

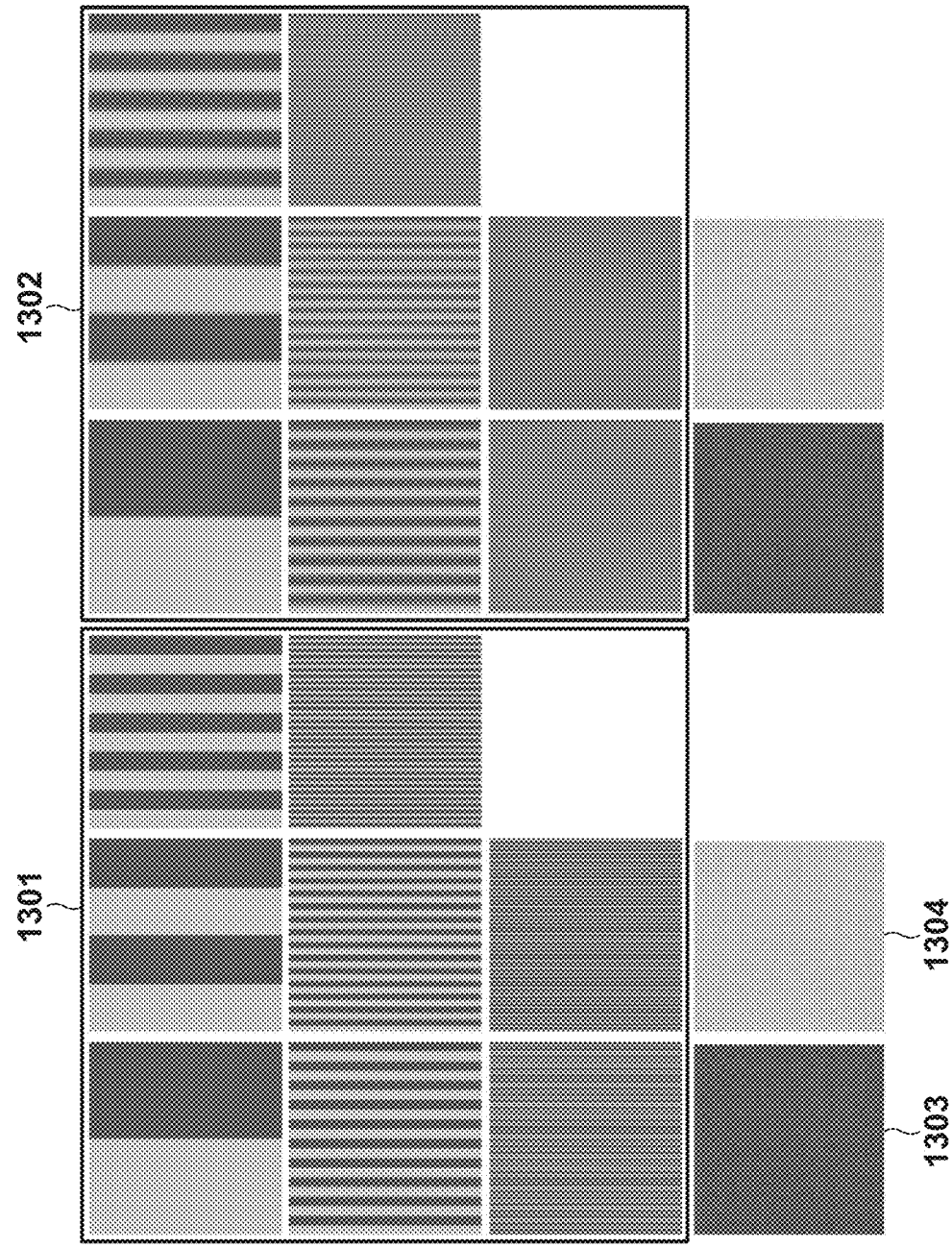

IMAGE PROCESSING APPARATUS, IMAGE PROCESSING METHOD AND STORAGE MEDIUM FOR STORING PROGRAM

BACKGROUND OF THE INVENTION

Field of the Invention

The present invention relates to an image processing apparatus for processing image data, an image processing method, and a storage medium for storing a program.

Description of the Related Art

Humans perceive what they see with their eyes three-dimensionally, and this is thought to be perception by the brain that is based on clues that come from both eyes, clues that come from each eye, and motion disparity. One clue from both eyes is retinal parallax which is a difference between the retinal images in the two eyes. Furthermore, line perspective and object size, gradient of texture, shadow, atmospheric distance and blurring effects, and the like are clues from a single eye. Using one or more of these clues, humans perceive a stereoscopic effect, that is horizontal depth, thickness, and vertical depth, and the anteroposterior relationship of "things".

When viewing a two-dimensional image that was captured by a camera or the like and then displayed, projected, or printed, a stereoscopic effect is perceived in an image from a difference between the degree of blurring between parts that are in-focus and parts that are blurred in accordance with their depth. In other words, the reproduction of parts where the image is in-focus and parts that are not in-focus (that are blurred) is important for achieving the stereoscopic effect. Also, various investigation is being conducted into what degree humans are able to visually distinguish between things that are in-focus and those that are not in-focus (blurred), specifically visual sensitivity. For example, a VTF (Visual Transfer Function) related to brightness fluctuation, a contrast sensitivity characteristic, and the like have been used to describe visual sensitivity.

Meanwhile, methods for, in a laser range finder for example, obtaining distance information for a scene including a subject at the time of capturing have been proposed, such as a method of measuring an actual distance from a capturing location to a target object, a method of measuring a distance from parallax information of two cameras, or the like. Japanese Patent Laid-Open No. 2009-251839 describes a technique for an image quality enhancing method that uses depth information.

When an image is output through an output apparatus such as a printer or the like, the sharpness of the output image degrades due to degradation of the sharpness of the image by a print medium or ink bleeding, or resizing input image data into a print medium size (print size). Similarly, in a display or projector, the sharpness of an image deteriorates in the output image. Accordingly, the reproducibility of parts where the image is in-focus and parts that are not in-focus (that are blurred) changes, and the stereoscopic effect of the image that a person perceives changes. Also, since the brightness of the image affects the stereoscopic effect of the image that a person perceives, the stereoscopic effect of the image that a person perceives changes due to the apparent brightness of in-focus parts.

Japanese Patent Laid-Open No. 2009-251839 describes processing in which the depth of each position of an image is estimated and calculated from the image, depths and image processing methods are associated, the image processing method is effectively selected as appropriate for each position, and an increase in resolution is achieved while preventing a deterioration in the stereoscopic effect.

SUMMARY OF THE INVENTION

An aspect of the present invention is to eliminate the above-mentioned problems with the conventional technology. The present invention provides an image processing apparatus for reducing the influence on sharpness of output processing, an image processing method, and a storage medium for storing a program.

The present invention in one aspect provides an image processing apparatus, comprising: an input unit configured to input image data for outputting a photographic image by an output apparatus; and a control unit configured to execute processing that controls a sharpness of the image in relation to data of each pixel of the image data based on information related to a distance from a focal plane corresponding to the image data in order to make a stereoscopic effect that a viewer who views the photographic image outputted by the output apparatus perceives closer to a stereoscopic effect that the image data has, wherein the control unit, in accordance with a luminance of a peripheral region that neighbors an in-focus region that is determined to be in-focus in the image, sets a sharpness control amount corresponding to the in-focus region.

By virtue of the present invention, it is possible to reduce the effect of output processing on sharpness.

Further features of the present invention will become apparent from the following description of exemplary embodiments with reference to the attached drawings.

BRIEF DESCRIPTION OF THE DRAWINGS

FIG. 2 is a view for describing a relationship between a focal plane when capturing, an image deviation amount, and a defocus amount.

FIG. 3 is a view for describing a method for calculating a distance between the focal plane and an object.

FIG. 4 is a view for illustrating a configuration of an image processing unit.

FIG. 13 is a view for illustrating a measurement chart.

DESCRIPTION OF THE EMBODIMENTS

Figure 1:
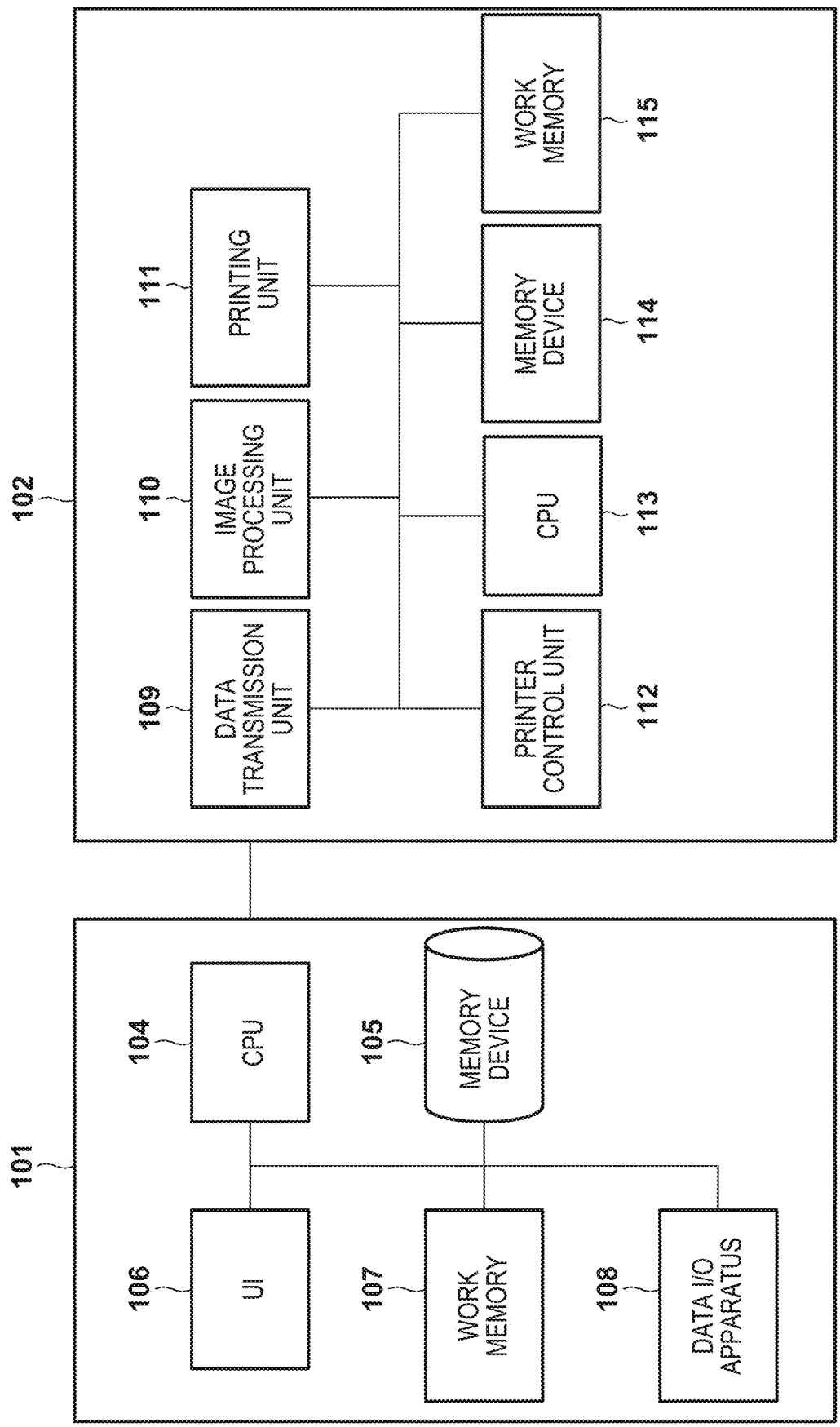
FIG. 1 is a view for illustrating an overall configuration of a print system in which an image processing apparatus is applied.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

First Embodiment

FIG. 1 illustrates an overall configuration of a print system in which an image processing apparatus according to the present embodiment is applied. In the present embodiment, an example in which an ink-jet printer which is an image processing apparatus is applied will be described. The print system of FIG. 1 includes a personal computer apparatus (PC) 101 (hereinafter referred to as "PC") and an output apparatus 102. The output apparatus 102 is connected to the PC 101 via an interface such as a network, a USB, or a local bus. The PC 101 makes print control instructions to the output apparatus 102, and transfers necessary information and data, and the like. In a memory device 105, an OS, a system program of the present embodiment, and various application software and parameter data necessary for various processing is stored and managed. The memory device 105 is configured by, for example, a hard disk or a flash ROM. A CPU 104 executes processing by using a work memory 107 upon execution of software stored in the memory device 105. A console unit 106 which serves as a user interface (hereinafter referred to as "UI"), regarding execution of the above described processing, accepts input by a user, and performs processing regarding display for the user, and includes an input device such as a keyboard and a pointing device and a display device such as a display. Also, a data I/O apparatus 108 performs input and output of data with respect to an external storage medium such as an SD card. Also, an image capturing apparatus (not shown) may be directly connected to the data I/O apparatus 108 or a data transmission unit 109, and data may be transferred without going through an external storage medium.

The output apparatus 102 includes the data transmission unit 109, a printer control unit 112, an image processing unit 110, and a printing unit 111, and receives print data from the PC 101. In the present embodiment, the print data is configured to include input image data which is a photographic image acquired by capturing a subject by the image capturing apparatus which may be camera, information corresponding to a distance from the focal plane at the time of capture corresponding to the input image data, image processing parameters, printer control data, and print information data of a printing medium or a print quality that a user selected on a UI. "Printing medium" means, for example, a paper medium. Also, the output apparatus 102 includes a CPU 113, a memory device 114, and a work memory 115. Regarding the output apparatus 102, by reading a program stored in the memory device 114 into the work memory 115 and executing the program, the output apparatus 102 is comprehensively controlled.

The information corresponding to the distance from the focal plane at the time of capture is a defocus amount and an image deviation amount, or the actual distance from the focal plane to an object. These will be described as data generated by the image capturing apparatus which may be a camera in the present embodiment, but limitation is not made to these, and there may also be data generated from information for which the distance was actually measured. Also, there may be data generated as the result of analyzing a blurring amount of input image data, for example, or other data that is used in combination with data for when capturing.

Input image data and information corresponding to the distance from the focal plane may be generated by the image capturing apparatus, and may be generated by the PC 101 or the output apparatus 102 connected to the image capturing apparatus. Also, information for generating the information corresponding to the distance from the focal plane may be obtained from the image capturing apparatus, and information corresponding to the distance from the focal plane may be generated in the PC 101 or the output apparatus 102 connected to the image capturing apparatus. Also, configuration may be taken such that the image capturing apparatus is connected to the PC 101, and information for generating the information corresponding to the distance from the focal plane is obtained in the output apparatus 102 via the PC 101 and the information corresponding to the distance from the focal plane is generated in the output apparatus 102. Here, the information for generating the information corresponding to the distance from the focal plane is, for example, a pair of images obtained by respectively photoelectrically converting light that passed through different regions of an exit pupil of an image capturing lens.

The data transmission unit 109 retrieves the input image data, the data corresponding to the distance from the focal plane at the time of capture, and the image processing parameters from the print data sent from the PC 101, sends them to the image processing unit 110, and sends printer control data to the printer control unit 112. The input image data is data resulting from resizing to a size of printing medium set by a user by resolution conversion processing stored as a program in the memory device 105 in the PC 101. Also, the resolution conversion processing is performed in the image processing unit 110 of the output apparatus 102. Also, in the present embodiment, the image processing unit 110 is within the output apparatus 102, but it may be configured within the PC 101.

Also, image processing parameters and printer control data may be stored in the memory device 105 within the PC 101 and may be stored in a non-illustrated memory device (a hard disk, a ROM, or the like) in the output apparatus 102. Configuration may be such that these are selected based on the print information data in the print data, and are sent to the image processing unit 110 and the printer control unit 112. The printer control unit 112 controls operation of the printing unit 111 in accordance with the printer control data. In the present embodiment, printing in the printing unit 111 is performed by an inkjet printing method.

FIG. 2 is a view for describing a relationship between a focal plane when capturing, an image deviation amount, and a defocus amount. A focal plane 201 is a plane of focus that is parallel with an imaging plane (image capturing plane) 203 in the image capturing apparatus. Also, a defocus amount 205 is a difference (difference between a planned image forming plane and an actual image forming plane) between the image capturing plane and a defocused image capturing plane position 204, and is proportional to the blurring amount. The defocus amount 205 is detected in the image capturing apparatus using a pupil-dividing phase difference detection method or a plurality of images for which blurring differs. For example, the defocus amount 205 may be calculated from the image deviation amount (amount of parallax) 206 of an image. Correlation values are calculated while shifting data relatively for a pair of pieces of pixel data obtained by respectively photoelectrically converting light that passed through different regions of an exit pupil of an image capturing lens, and making the image shift amount 206 at which the correlation is the highest the amount of parallax. Furthermore, by using a conversion coefficient decided in accordance with a pixel pitch and a lens of an image capturing element in relation to the calculated image shift amount 206, the defocus amount 205 of a subject imaging plane in relation to the planned image forming plane is calculated.

Also, the defocus amount may be calculated by a DFD (Depth From Defocus) method. In the DFD method, a plurality of images among which blurring differs are obtained by controlling capturing parameters of an image capturing optical system, and a measurement target pixel and peripheral pixels thereof are used to calculate an amount of correlation of blurring therebetween among the plurality of obtained images, to thereby calculate the defocus amount.

Next, using FIG. 3, a method for calculating the distance between the focal plane and the object will be described. In FIG. 3, a distance 301 is an in-focus object distance OBJ(0) and a distance 302 is an image capturing plane distance S(0) corresponding to an in-focus image object. Also, a distance 303 is an object distance OBJ(def), and a distance 304 is a distance from the focal plane to the object. According to the lens formula, the following Equations (1) and (2) hold, and therefore it is possible to calculate the object distance OBJ(def) by the following Equation (3).

$$1/OBJ(0)+1/S(0)=1/f \quad (1)$$

$$1/OBJ(def)+1/(S(0)+def)=1/f \quad (2)$$

$$OBJ(def)=[(S(0)+def)*f]/[(S(0)-def)*f] \quad (3)$$

By subtracting the object distance calculated by Equation (3) from the in-focus object distance, the distance 304 from the focal plane to the object is calculated. The above-described information corresponding to the distance from the focal plane is information that is proportional to the distance from the focal plane. For that reason, any of the above-described image shift amount 206, defocus amount 205, and distance 304 from the focal plane may be the information corresponding to the distance from the focal plane.

Figure 5A:
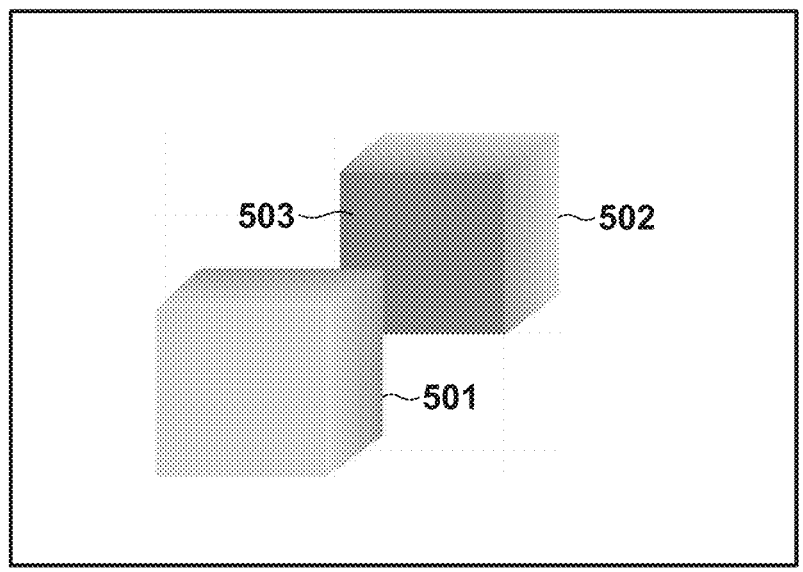
FIGS. 5A and 5B are views for describing a defocus map.

Next, description of a defocus map will be given. A defocus map maps the defocus amount 205 described above at a plurality of locations on input image data, and FIG. 5A illustrates an example of a defocus map. In the present embodiment, FIG. 5A illustrates a defocus map corresponding to input image data in which two cubes 501 and 502 are captured, and information of the defocus amount 205 corresponding to each pixel of the input image data is held.

Figure 5B:
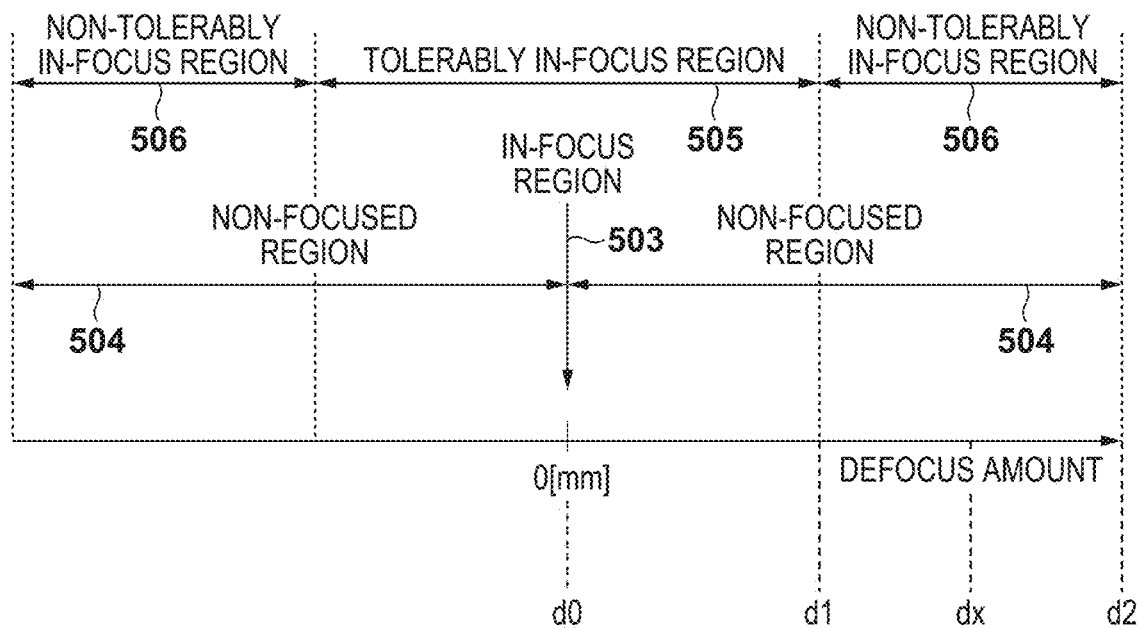

FIG. 5B is a view for describing a correspondence between the defocus amount 205 and each region used in the present embodiment. The value "0" of the defocus amount 205 is the defocus amount 205 corresponding to the focal plane when capturing in FIG. 5B, and corresponds to the blackest part (the region 503) of FIG. 5A. The further from the value "0" that the defocus amount 205 is, the whiter the corresponding part is in FIG. 5A. In the defocus map of FIG. 5A, the region of the value "0" of the defocus amount 205 corresponds to the region 503, and is an image region that is in-focus (focal plane). Below, the region 503 will be referred to as the in-focus region. In the present embodiment, regions other than the region 503 are regions that do not correspond to the focal plane on the defocus map, and are referred to as non-focused regions 504. The defocus amount d1 is a value at the boundary between a tolerably in-focus region 505 and a non-tolerably in-focus region 506. Furthermore, the defocus amount d2 is the maximum defocus amount included in the defocus map. The defocus amount dx represents a specific defocus amount between the defocus amounts d1 and d2.

Also, in the present embodiment, a region where the focus is tolerable is referred to as a tolerably in-focus region 505. The tolerably in-focus region 505 may define the range of a depth of field, and may be defined arbitrarily by subject experiment. Also, regions other than the tolerably in-focus region 505 are regions that are not a tolerably in-focus region 505 and are referred to as a non-tolerably in-focus region 506. In FIG. 5B, the defocus amount 205 is the abscissa, but the above-described image shift amount 206 and the distance 304 from the focal plane, which is information corresponding to the distance from the focal plane, may be used. Also, in the present embodiment, the in-focus region 503 and the tolerably in-focus region 505 are generic terms for regions that are determined to be in-focus, and the non-focused region 504 and the non-tolerably in-focus region 506 are generic terms for regions that are determined to not be in-focus.

Figure 6:
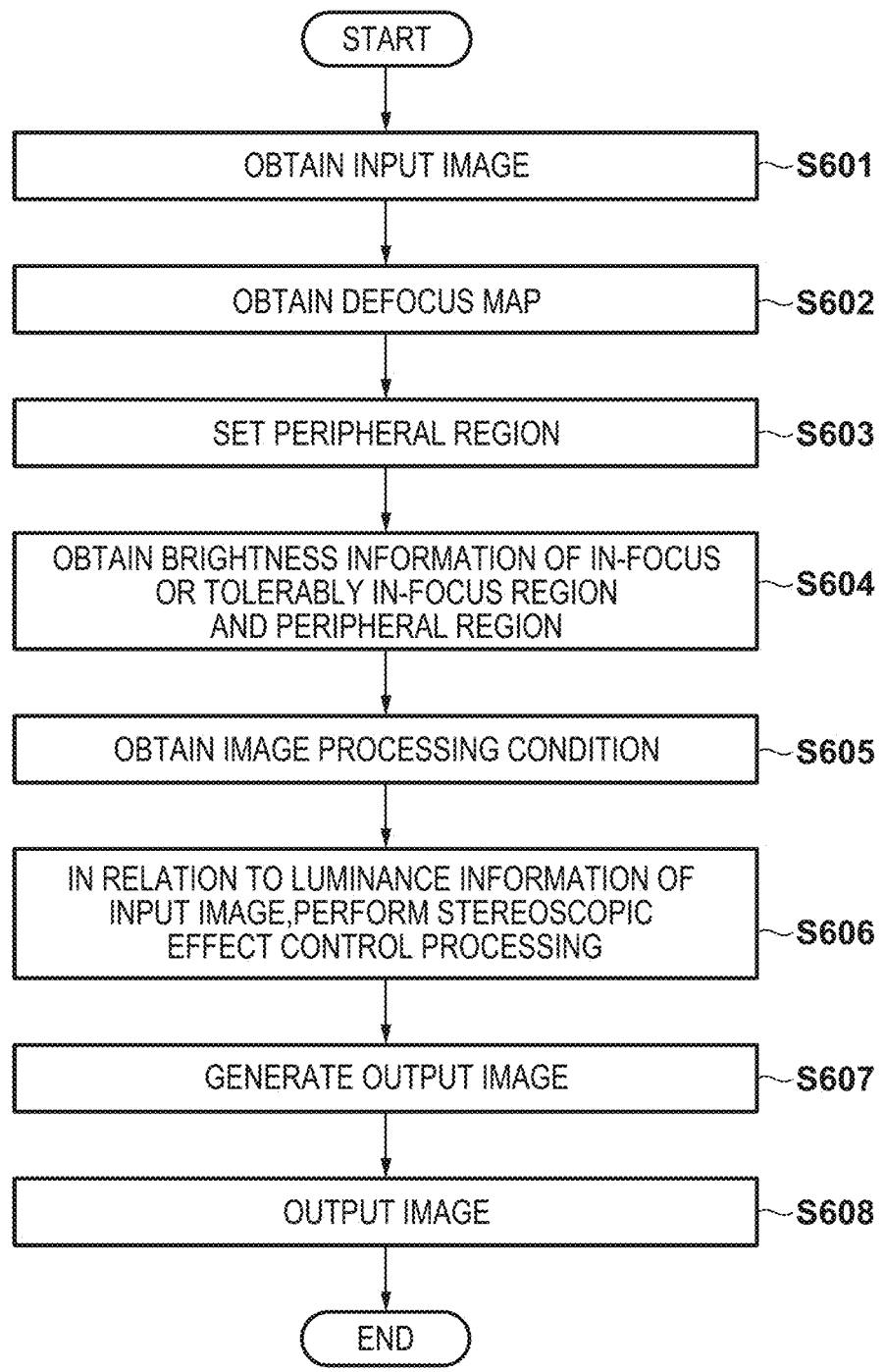
FIG. 6 is a flowchart illustrating image processing.

The configuration of the image processing unit 110 in the present embodiment is illustrated in FIG. 4. Also, with reference to the flowchart of FIG. 6, image processing in the present embodiment will be described. The image processing unit 110 obtains (step S601) input image data, and obtains (step S602) the above-described defocus map as information corresponding to the distance from the focal plane at the time of capture. Furthermore, a region setting unit 401 uses the input image data and/or the defocus map to set a peripheral region in the input image (step S603). Processing in the region setting unit 401 will be described later. Next, a brightness information obtainment unit 402 obtains, from the input image, brightness information of an in-focus region or a tolerably in-focus region set from the information of the defocus map and the peripheral region set by the region setting unit 401 (step S604). Furthermore a stereoscopic effect control unit 403 additionally obtains (step S605) an image processing condition 405 that is specified based on an output characteristic of the output apparatus 102 which is stored in the memory device 105 or a memory device (a hard disk, a ROM, or the like) in the output apparatus 102 (not shown).

In the present embodiment, the image processing condition 405 is held in a memory device for each print condition, and the image processing condition 405 is selected in accordance with the above-described print information data, and inputted into the stereoscopic effect control unit 403. Details of processing in the stereoscopic effect control unit 403 will be described later, but the stereoscopic effect of the image is controlled (step S606) depending on the input image data, the defocus map, and the image processing condition 405 which is specified based on an output characteristic of the output apparatus 102. Note that details of the image processing condition 405 will be described later.

Next, in the output image generating unit 404, data for printing by a printhead of an ink-jet printer is generated (step S607) in relation to output image data (RGB) outputted from the stereoscopic effect control unit 403. For example, firstly, color conversion processing for converting device-independent RGB data into device-dependent RGB data is executed, and ink color separation processing for converting from the device-dependent RGB data into ink color data is executed.

Furthermore, tone correction processing for performing a tone correction to linearly associate tone characteristics of the printing apparatus, halftone processing for converting ink color data into ink-dot ON/OFF information, and the mask data conversion processing for generating binary data to be printed in a print scan by a printhead is executed. Since these are all common processes in ink-jet printers, detailed description thereof will be omitted. The output data generated by the output image generating unit 404 is sent to the printing unit 111, and printed on the print medium (step S608).

[Stereoscopic Effect in Output Apparatus]

Here, output characteristics that affect the sharpness of the output apparatus 102 and control of the stereoscopic effect will be described. Humans perceive a sense of depth and a stereoscopic effect in an image from a difference in sharpness between a tolerably in-focus regions including the in-focus regions which are in-focus (focused) and non-tolerably in-focus regions which are not in-focus (are blurred) when viewing a two-dimensional image captured by a camera or the like. Meanwhile, the sharpness of the outputted image, when an image is outputted not only by a printer but also by an output apparatus such as a display or a projector, differs from the sharpness of an image that image data inputted into the output apparatus has. In other words, depending on the processing that is performed in order to output on the output apparatus, the sharpness that image data has prior to being input into the output apparatus changes and the stereoscopic effect that a viewer perceives deteriorates. Also, there is the possibility that due to the effect of an illumination condition and the environment in which the viewer views the image such as the viewing distance or visual characteristics of the person viewing the image, the sharpness of an image that a viewer perceives differs from the sharpness that the image outputted by the output apparatus has, and so the stereoscopic effect is perceived even less.

Figure 7:
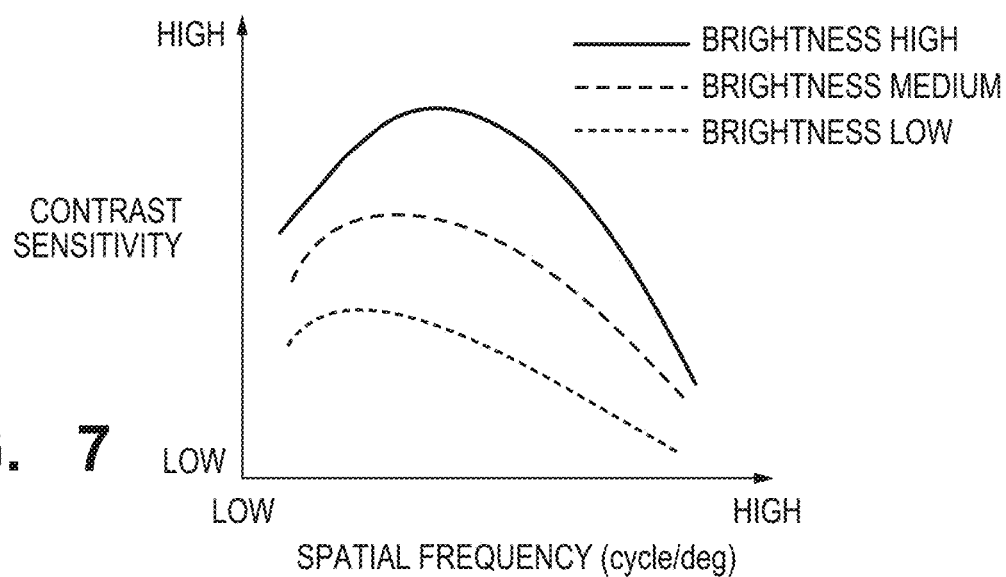
FIG. 7 is a view illustrating a contrast sensitivity characteristic.

FIG. 7 illustrates a schematic drawing of a contrast sensitivity characteristic (contrast sensitivity functions: CSF), and the abscissa represents spatial frequency while the ordinate represents contrast sensitivity. As illustrated in FIG. 7, the contrast sensitivity characteristic differs depending on the average luminance (brightness) of the image. In the case where the average luminance is of a clearly visible level, the contrast sensitivity characteristic is at a maximum at 2 to 6 (cycles/deg). Sensitivity degrades when the spatial frequency is lower or higher than that, and furthermore, the spatial frequency of the peak tends to become larger and the peak higher the higher the average luminance is.

The amount of change in luminance that humans can perceive differs depending on the spatial frequency, and there is a bandpass characteristic as can be seen from the contrast sensitivity characteristic illustrated in FIG. 7. Also, as can be seen from the contrast sensitivity characteristic according to the difference in average luminance (brightness) illustrated in FIG. 7, the peak of the contrast sensitivity becomes higher as the average luminance becomes brighter, and the frequency of the peak shifts towards the high frequency side. Due to this influence, there are cases in which the sharpness relationship between the tolerably in-focus regions and the non-tolerably in-focus regions, which affects the stereoscopic effect of the input image, cannot be maintained when viewing the output image.

Figure 8A:
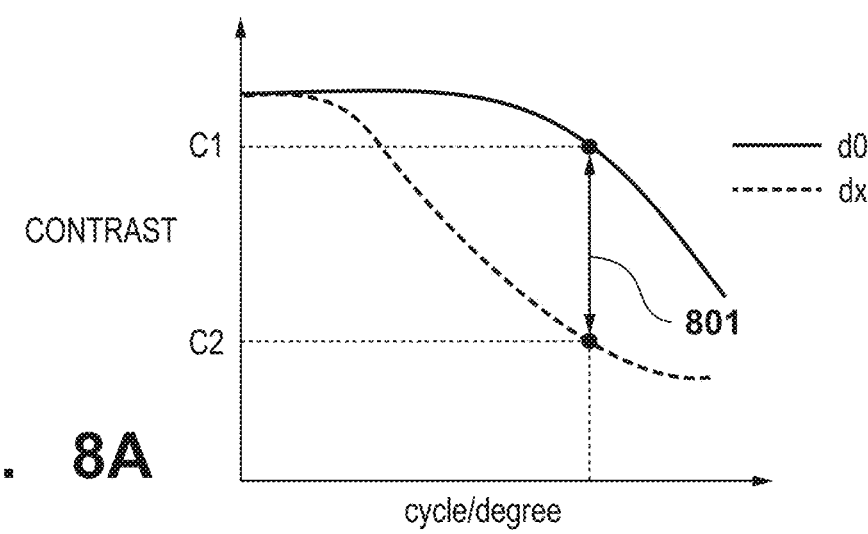
FIGS. 8A and 8B are views for describing a change in a relative relationship for sharpness.
Figure 8B:
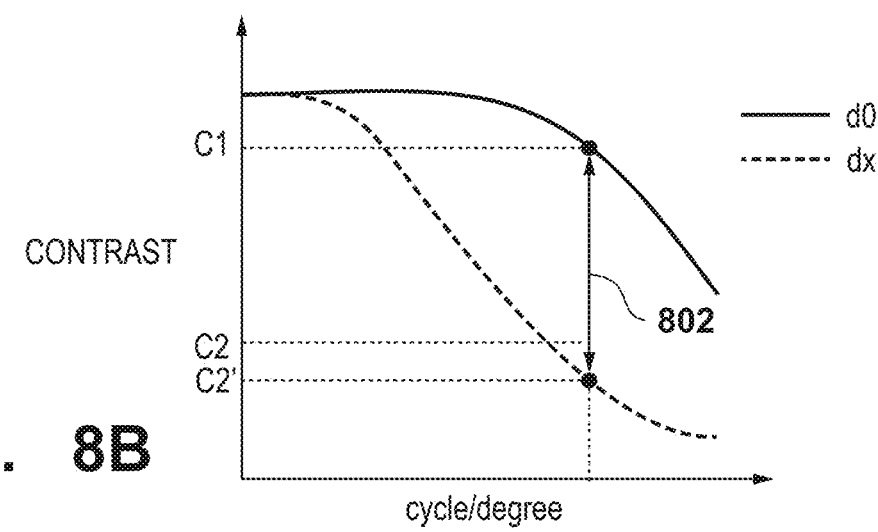

More detailed description is given using the graphs of FIGS. 8A and 8B. Note that in order to simplify the description for FIGS. 8A and 8B, description will be given using an example of an image in which the spatial frequency characteristic of an image corresponding to a specific defocus amount included in a non-focused region and the spatial frequency characteristic of an image in an in-focus region have the same frequency peak. FIG. 8A illustrates a relative relationship, in input image data which has a stereoscopic effect due to a difference in sharpness, between a contrast C1 which indicates the sharpness of an in-focus region of the input image data at a specific frequency and a contrast value C2 which indicates the sharpness of a non-focused region. Meanwhile, when a contrast sensitivity in the case where "the average luminance (brightness) is medium" of FIG. 7 is applied, the contrast relationship between the in-focus region and the non-focused region of the output image changes to the contrast values C1 and C2' indicated in FIG. 8B.

As is clear from FIGS. 8A and 8B, the amount of change in the sharpness of the input image data differs between the in-focus region and the non-focused region due to the influence of the contrast sensitivity characteristic. Accordingly, the difference (the relationship 802 between the contrast values C1 and C2') in sharpness which affects the stereoscopic effect differs from the difference (the relationship 801 between the contrast values C1 and C2) in sharpness in the input image data, and the image ends up not having an appropriate stereoscopic effect. In the present embodiment, by controlling the sharpness appropriately depending on the state of blurring based on a characteristic related to sharpness for each defocus amount 205 for which the contrast sensitivity characteristic is applied, it is possible to control the sharpness of the output image having a stereoscopic effect. Also, as will be described later, sharpness control is performed in accordance with the luminance of a peripheral region for a tolerably in-focus region in particular. Accordingly, in control of the sharpness of an output image having a stereoscopic effect, it is possible to control the sharpness according to the apparent brightness corresponding to the peripheral region for a tolerably in-focus region.

In the later-described image processing condition 405, a relationship between a stereoscopic effect control amount and the defocus amount based on a characteristic related to sharpness for each defocus amount 205 to which the contrast sensitivity characteristic is applied is set. In an output image whose image sharpness is controlled appropriately thereby, a contrast value relationship between the in-focus region and the non-focused region is C1 and C2 respectively as illustrated in FIG. 8A. As illustrated in FIGS. 8A and 8B, by the difference in sharpness in an output image resulting from stereoscopic effect control processing being executed based on the image processing condition 405 being smaller than in the case where the processing is not performed (relationship 802 between the contrast values C1 and C2'), a difference in sharpness ends up being equal (or very close) to that in the input image, and it is possible to achieve an appropriate stereoscopic effect.

In FIGS. 8A and 8B, to simplify the description, the contrasts corresponding to two points of the spatial frequency of an image of an in-focus region and the spatial frequency of an image corresponding to a specific defocus amount 205 included in a non-focused region are compared. Limitation is not made to this, and it is similar for images corresponding to an in-focus region and another defocus amount 205 of a non-focused region. Also, it is similar even for two points between an image corresponding to a specific defocus amount 205 included in a tolerably in-focus region and an image corresponding to a specific defocus amount 205 included in a non-tolerably in-focus region.

Figure 9:
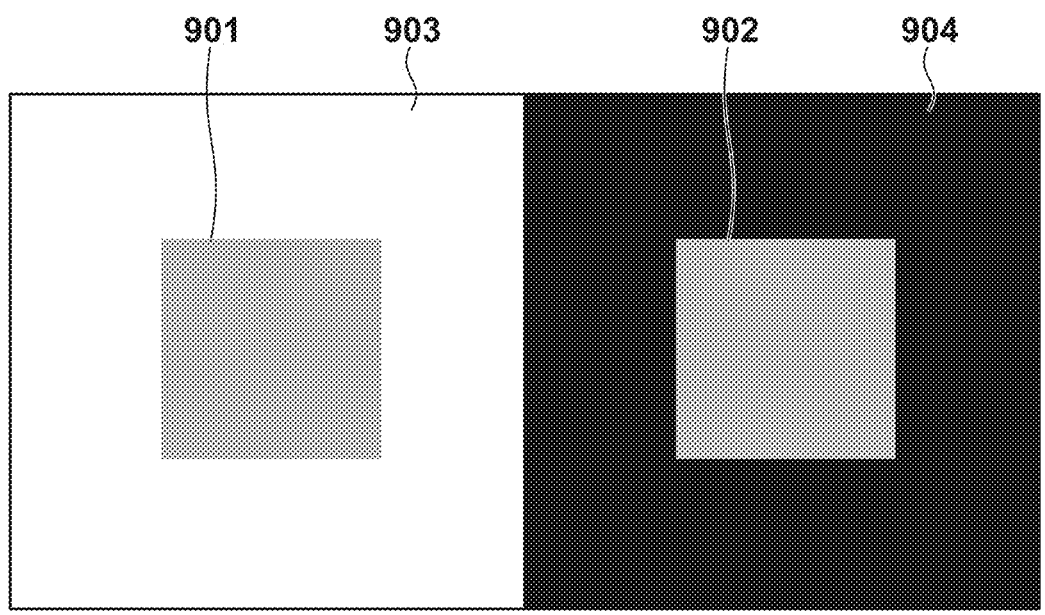
FIG. 9 is a view for describing a contrast phenomenon of brightness.

In addition to the previously-described contrast sensitivity characteristic, a brightness contrast phenomenon occurs due to the workings of a visual system called lateral inhibition, which is a human visual characteristic. This phenomenon is described in FIG. 9. Irrespective of the fact that the actual brightnesses of the region 901 and the region 902 in FIG. 9 are equivalent, the brightness as perceived/recognized when seen through the eye of a human appears darker than reality for the region 901 and brighter than reality for the region 902 due to the workings of the aforementioned visual system. This is due to the fact that the nerve cells of the visual system are inhibited by other nerve cells that are close to or neighboring, and in conjunction with the nerve cells that are actually hit by the light responding strongly, the activity of surrounding nerve cells is inhibited. Specifically, since the region 903 in FIG. 9 is white, the response of the nerve cells that react to the region 903 is strong, and as a result, the nerve cells that react to the region 901 are inhibited, and the gray color of the region 901 appears darker. Meanwhile, since the region 904 is black, no light hits the nerve cells that react to that region therefrom, the nerve cells are not active, and therefore the nerve cells that react to the region 902 are not inhibited, and compared to the case where the surroundings are black as with the region 901, the gray color of the region 902 appears brighter.

In other words, when a person views a tolerably in-focus region of an image, the apparent brightness and the actual brightness differ when the brightness contrast phenomenon occurs due to the workings of the previously-described lateral inhibition visual system. Because the contrast sensitivity characteristic changes depending on the difference in brightness, the sharpness of the tolerably in-focus region differs. As described above, the viewer perceives a stereoscopic effect due to the difference between the sharpness of tolerably in-focus regions and the sharpness of the non-tolerably in-focus regions. In other words, even if the brightness of tolerably in-focus regions is the same, there is the possibility that it will be impossible for a viewer who is viewing an image to perceive the stereoscopic effect of an image outputted by an output apparatus due to the brightness of the peripheral regions.

For example, in the case where the average luminance value of the peripheral regions is higher than the average luminance value of a tolerably in-focus region in the input image, control is performed to increase the sharpness of the tolerably in-focus region in the output image more than in the case were the average luminance value of the peripheral regions is lower than the average luminance value of a tolerably in-focus region. In other words, in the present embodiment, in the sharpness control illustrated in FIGS. 8A and 8B, the sharpness is controlled in accordance with a luminance value of a peripheral region for a tolerably in-focus region in particular. Note that a sharpness control amount is set in the later-described image processing condition 405 as a stereoscopic effect control amount corresponding to a defocus amount 205, having taken into consideration an output image characteristic (sharpness) of each defocus amount 205 for which the contrast sensitivity characteristic is applied.

Figure 10A:
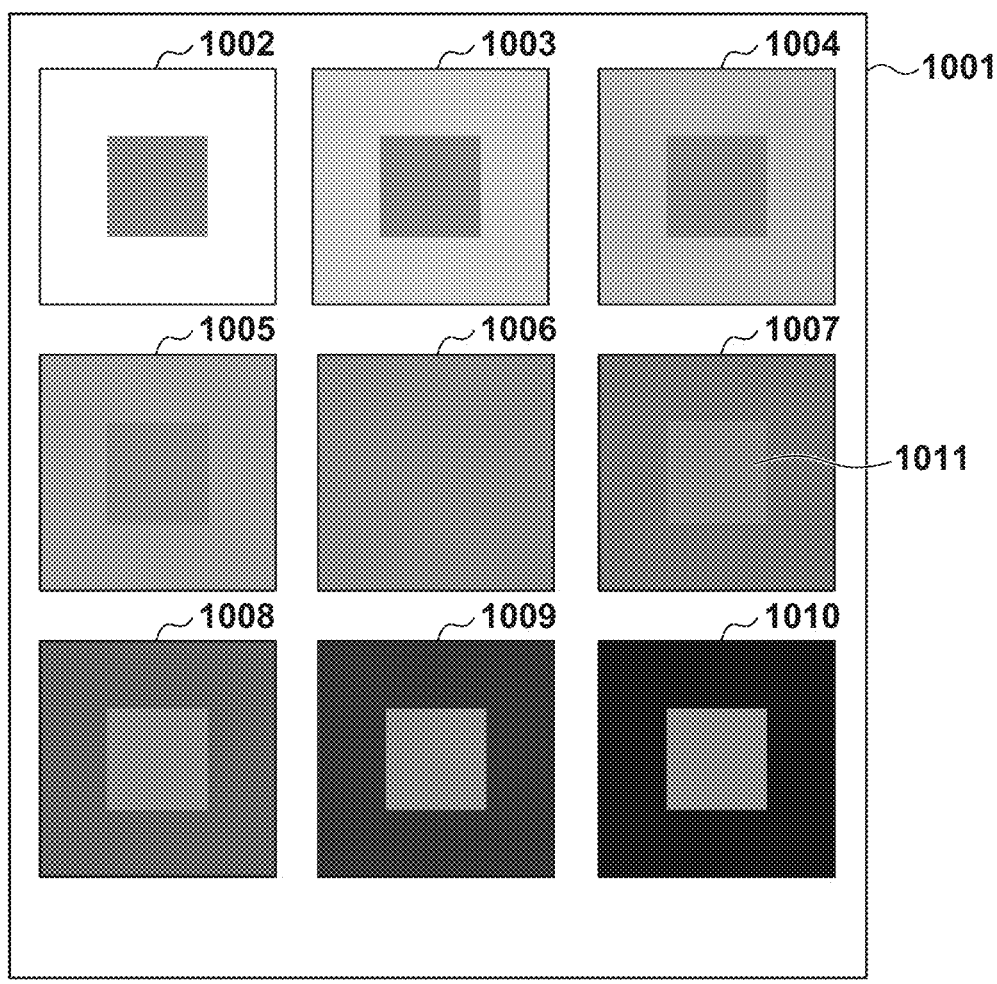
FIGS. 10A and 10B are views illustrating a measurement chart.

In the present embodiment, a stereoscopic effect control amount is set in the image processing condition 405 for each defocus amount 205 and contrast sensitivity characteristic corresponding to various average luminances (brightness). For example, a subject experiment is conducted in advance using a chart image illustrated in FIG. 10A. At that time, the amount of change in apparent brightness of the region 1011 when the brightness of the peripheral region is changed with respect to the region 1011 is set in advance. Thereby, it is possible to appropriately set a contrast sensitivity characteristic to be taken into consideration for a tolerably in-focus region according to a relationship between brightness of the tolerably in-focus region and peripheral regions thereof in the input image.

Figure 10B:
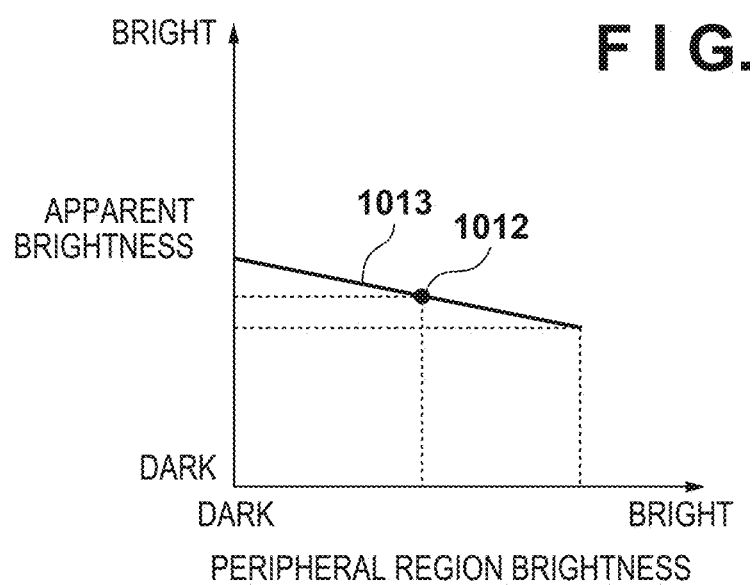

Note that a point 1012 in FIG. 10B corresponds to a case (patch 1006) where the brightness of the region 1011 and its peripheral regions are equivalent. Also, FIG. 10B indicates a trend (for example, patch 1003) that the apparent brightness of the region 1011 becomes brighter the darker the peripheral regions become and that the apparent brightness of the region 1011 becomes darker the brighter the peripheral regions become.

For this reason, it is possible to achieve an appropriate stereoscopic effect in an output image by appropriately controlling the sharpness of tolerably in-focus regions, including in-focus regions, in accordance with information of the brightness of a peripheral region of the tolerably in-focus regions, including in-focus regions.

[Region Setting Processing and Obtaining Brightness Information]

Region setting processing will be described. In the region setting unit 401, a peripheral region is set for a tolerably in-focus region of an input image based on a defocus map. When setting a peripheral region, an input image illustrated in FIG. 11A and a defocus map (FIG. 11B) corresponding thereto are made to be input of the region setting unit 401. Hereinafter, three peripheral region setting methods will be described using FIGS. 11C, 11D, and 11E.

Figure 11A:
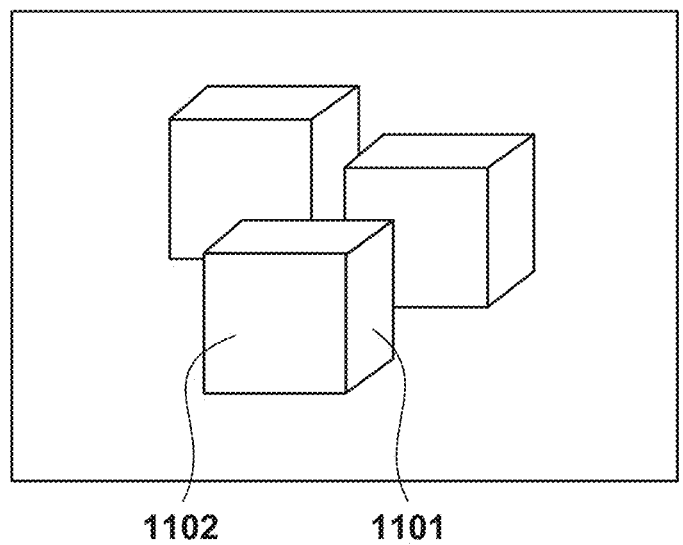
FIGS. 11A to 11E are views for describing peripheral region settings.

A surface 1102 of an object 1101 in an input image of FIG. 11A is a focal plane at a time of capture. Accordingly, a region 1103 in the defocus map (FIG. 11B) is an in-focus region. A peripheral region set in the region setting unit 401 is present around a tolerably in-focus region of the input image, and is a region that affects the occurrence of the previously-described brightness contrast phenomenon in a case where the tolerably in-focus region is focused on. One setting method is to set a peripheral region 1105 to a range of a specific pixel distance 1106 from a barycentric pixel of the tolerably in-focus region 1104 for the tolerably in-focus region 1104 illustrated in FIG. 11C.

Figure 11B:
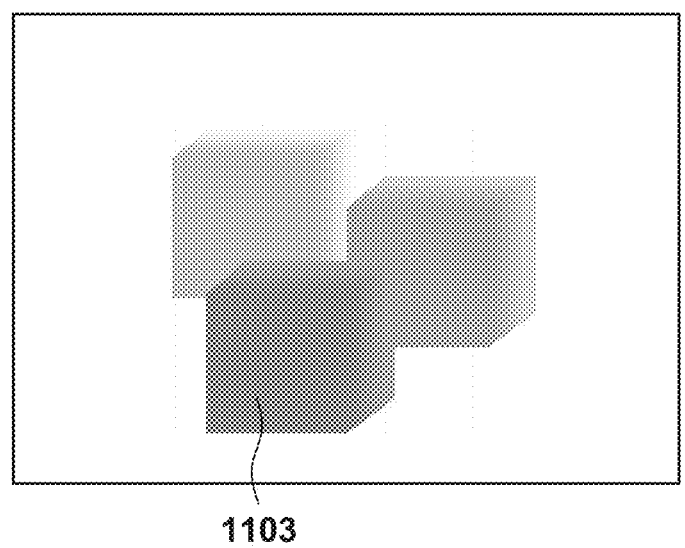
Figure 11C:
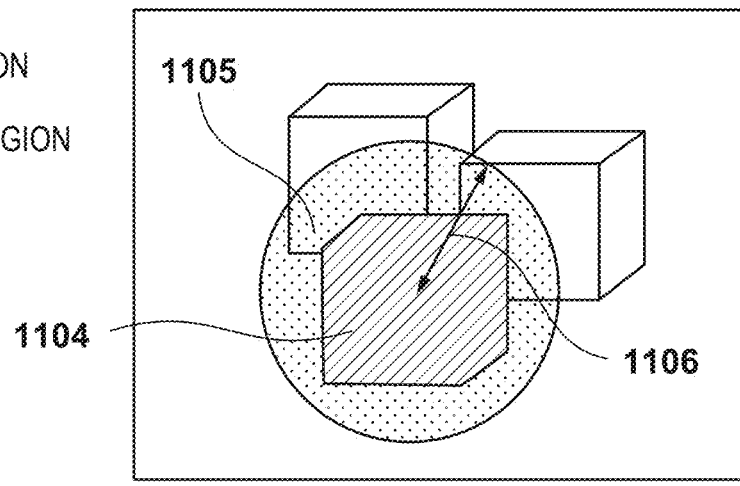
Figure 11D:
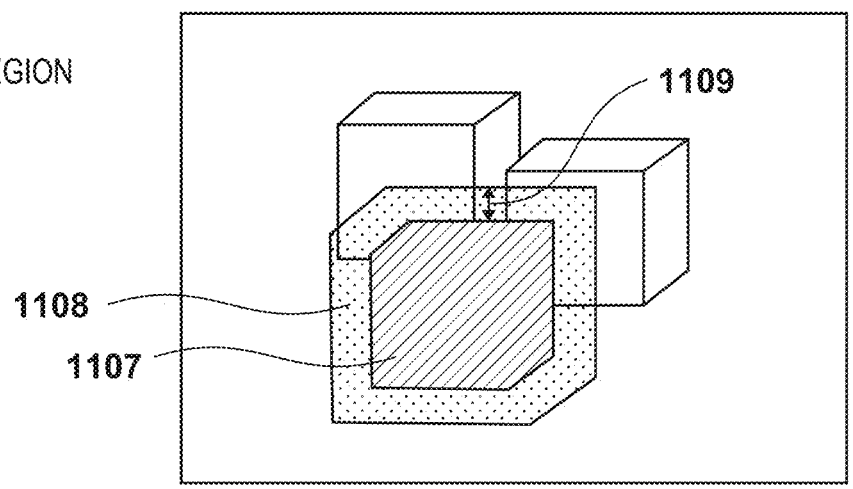

Also, one setting method is to set a peripheral region 1107 to a range of a specific pixel distance 1109 from boundary pixels of the tolerably in-focus region 1107, as illustrated in FIG. 11D. Note that the specific pixel distances 1106 and 1109 are calculated from an angle of view for which lateral inhibition occurs when the tolerably in-focus region is focused on in consideration of the output image size or the like. Alternatively, the specific pixel distances 1106 and 1109 may be set in advance by calculations by collecting data of a range of a peripheral region for which a brightness contrast phenomenon occurs from a subject experiment or the like, and recorded in a memory device in the output apparatus 102 (such as a hard disk or a ROM).

Figure 11E:
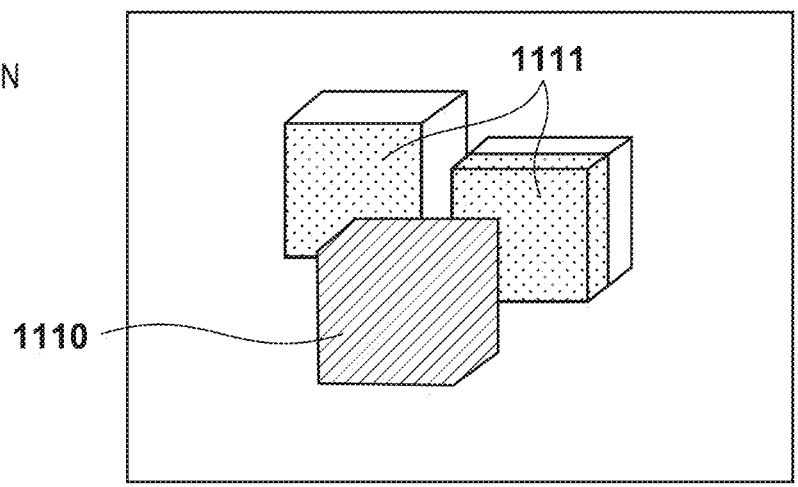

Furthermore, one setting method is to set peripheral regions 1111 with reference to a defocus map of FIG. 11B, as illustrated in FIG. 11E. For example, the peripheral regions 1111 are set as a region included in a specific defocus amount 205 range in the non-tolerably in-focus regions.

Thus far, methods for setting peripheral regions corresponding to a tolerably in-focus region have been discussed, but, for example, subject detection may be performed using a common image feature detection technique, saliency, or the like, and the peripheral region set by the above-described method in relation to a primary object region included in the tolerably in-focus regions. Parameters (the defocus amount 205, the pixel distances 1106 and 1109, and the like) for setting the above-described peripheral regions are stored in a memory device (a hard disk, a ROM, or the like) in the output apparatus 102 (not shown) in FIG. 1. The region setting unit 401 outputs to the brightness information obtainment unit 402 all pixel values and pixel coordinates of peripheral regions in an input image set by the aforementioned parameters. The brightness information obtainment unit 402 calculates average luminance information of a peripheral region in an input image from the pixel values and pixel coordinates of the peripheral region outputted from the region setting unit 401 and average luminance information of a tolerably in-focus region in the input image, and outputs the average luminance information to the stereoscopic effect control unit 403 as brightness information for each region.

[Stereoscopic Effect Control Processing]

Stereoscopic effect control processing will be described. In the stereoscopic effect control unit 403, the sharpness of the input image data is controlled by a sharpness control parameter set in the image processing condition 405. In the image processing condition 405, a stereoscopic effect control amount, which corresponds to a defocus amount 205 and for which an output image characteristic (sharpness) for each defocus amount 205 for which the contrast sensitivity characteristic is applied is taken into consideration, is set.

FIGS. 12A to 12F illustrates a relationship between the defocus amount 205 for which the contrast sensitivity characteristic set in the image processing condition 405 is applied and the stereoscopic effect control amount. A method for generating the image processing condition 405 will be described later. In the stereoscopic effect control unit 403 of the present embodiment, sharpness processing is performed by applying, in relation to luminance information of each pixel of the input image data, the stereoscopic effect control amount (simply referred to as the control amount) set in the image processing condition 405 in consideration of the defocus amount 205 of the defocus map of a processing target pixel and brightness information of a tolerably in-focus region and of a peripheral region calculated by the brightness information obtainment unit 402.

In the sharpness processing, for example, a Laplacian of Gaussian filter of Equation (4) and an unsharp mask are used. A formula for converting luminance information of the input image data when the Laplacian of Gaussian filter of Equation (4) is used is indicated in Equation (5). Out(x, y) is image data after the stereoscopic effect control processing, and β is a stereoscopic effect control amount corresponding to a defocus amount 205 set in the image processing condition 403. β, as described in the preceding paragraph, is set according to the image processing condition 405 so as to control the sharpness of a tolerably in-focus region of the output image to become higher in a case where the average luminance value of a peripheral region in the input image is higher than the average luminance value of the tolerably in-focus region than in a case where the average luminance value of a peripheral region in the input image is lower than the average luminance value of the tolerably in-focus region.

$$h(x,y)=[(x^2+y^2-2\sigma^2)/(2\pi\sigma^2)]\exp[-(x^2+y^2)/(2\pi^2)] \quad (4)$$

$$\text{Out}(x,y)=I(x,y)+(I(x,y)-h(x,y))\times\beta \quad (5)$$

In FIGS. 12A to 12F, the defocus amount d1 is a value at the boundary of the tolerably in-focus region and the non-tolerably in-focus region indicated in FIG. 5B. Furthermore, the defocus amount d2 is the maximum defocus amount included in the defocus map.

Figure 12A:
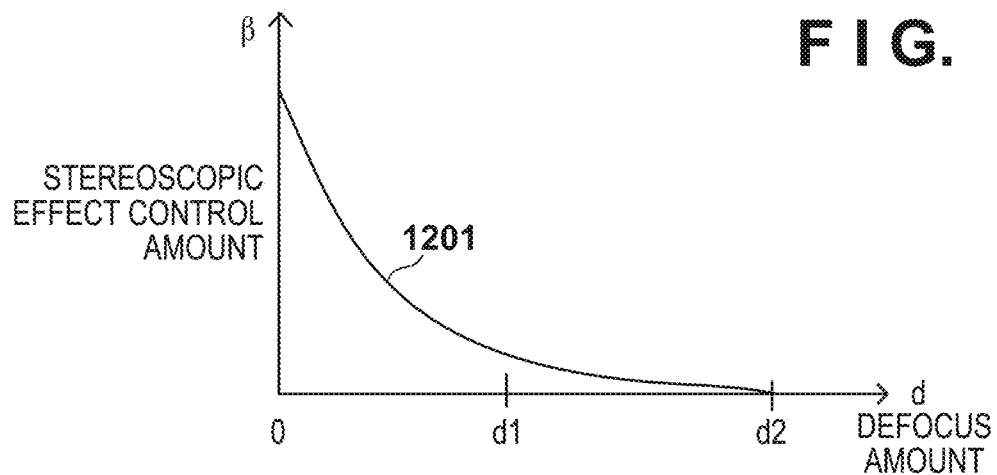
FIGS. 12A to 12F are views illustrating a relationship between a defocus amount and a stereoscopic effect control amount.
Figure 12B:
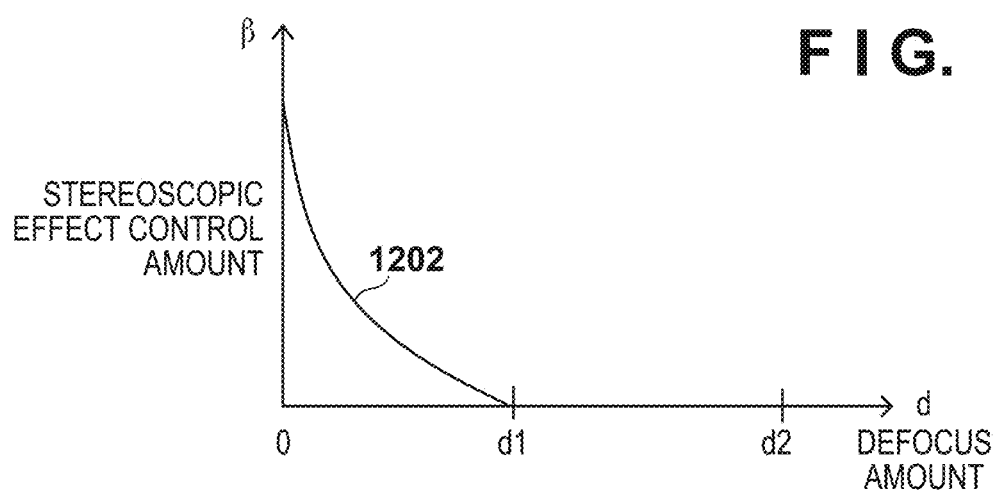

In order to achieve an appropriate stereoscopic effect taking into consideration a characteristic related to sharpness for each defocus amount 205 for which a contrast sensitivity characteristic is applied in the output image, it is necessary to appropriately set the control amount according to the defocus amount 205 as indicated in FIG. 12A. FIG. 12A illustrates an example of control amount, and the control amount 1201 becomes smaller as the defocus amount 205 becomes larger.

Note that the stereoscopic effect control amount according to the defocus amount 205 is not limited to what is illustrated in FIG. 12A. For example, the stereoscopic effect control amount may be made to be 0 for the non-tolerably in-focus regions as illustrated in the control amount 1202 of FIG. 12B. Even if the control amount for the non-tolerably in-focus regions is made to be 0, the difference in sharpness between tolerably in-focus regions and non-tolerably in-focus regions approaches the difference in sharpness between tolerably in-focus regions and non-tolerably in-focus regions in the input image, and therefore it is possible to achieve an output image with a stereoscopic effect.

Figure 12C:
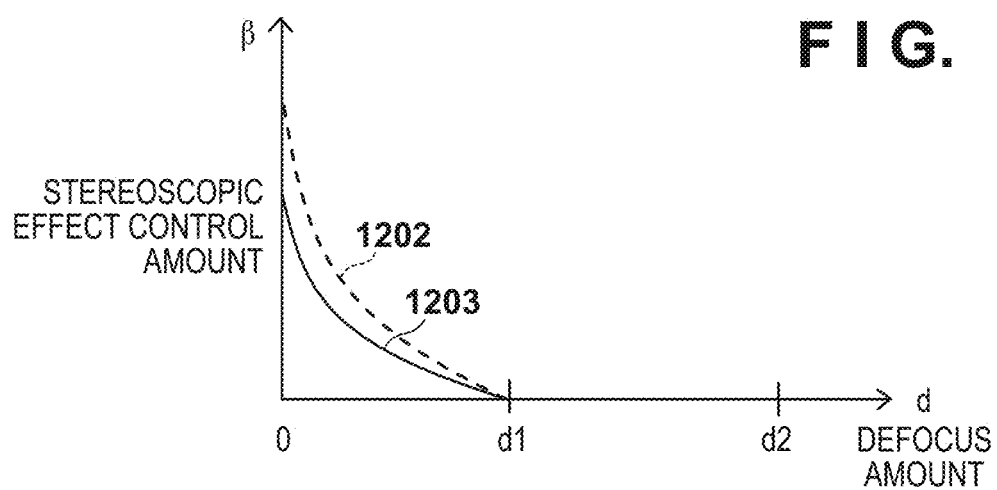
Figure 12D:
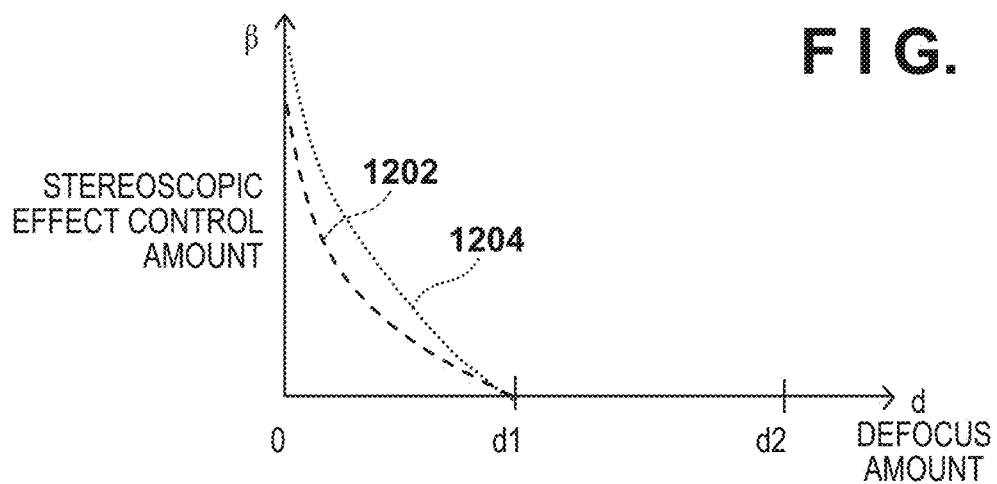

In the present embodiment, taking into consideration that the sharpness that a viewer perceives differs depending on ambient luminance as described above, the stereoscopic effect control processing for an image is set based on the average luminance value of a tolerably in-focus region. Specifically, control is performed so that the sharpness of the tolerably in-focus region in the output image becomes higher in a case where an average luminance value of a peripheral region positioned in the periphery of a tolerably in-focus region in the input image is higher than an average luminance value of a tolerably in-focus region than in a case where the average luminance value of the peripheral region is lower than the average luminance value of the tolerably in-focus region. FIG. 12D illustrates a control amount 1204 in a case where the average luminance value of a peripheral region is higher than the average luminance value of a tolerably in-focus region. Also, FIG. 12C illustrates a control amount 1203 in a case where the average luminance value of a peripheral region is lower than the average luminance value of a tolerably in-focus region. Both set the stereoscopic effect control amount to become smaller as the defocus amount becomes larger, but the control amount 1204 in FIG. 12D is set to be larger than the control amount 1203 in FIG. 12C. Specifically, a larger value is set for the control amount for reproducing the stereoscopic effect in the case where a peripheral region in brighter than in an in-focus region than for a control amount for reproducing the stereoscopic effect in the case where a peripheral region is darker than an in-focus region.

Figure 12E:
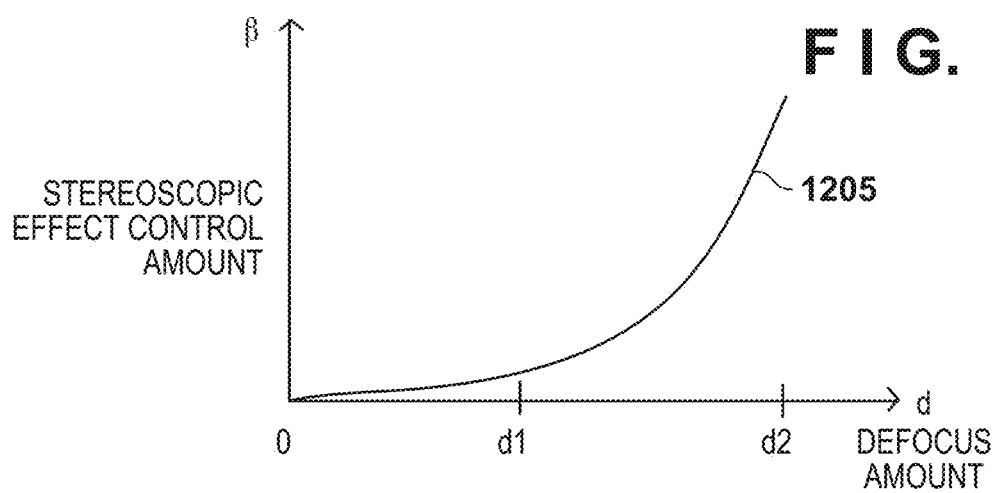
Figure 12F:
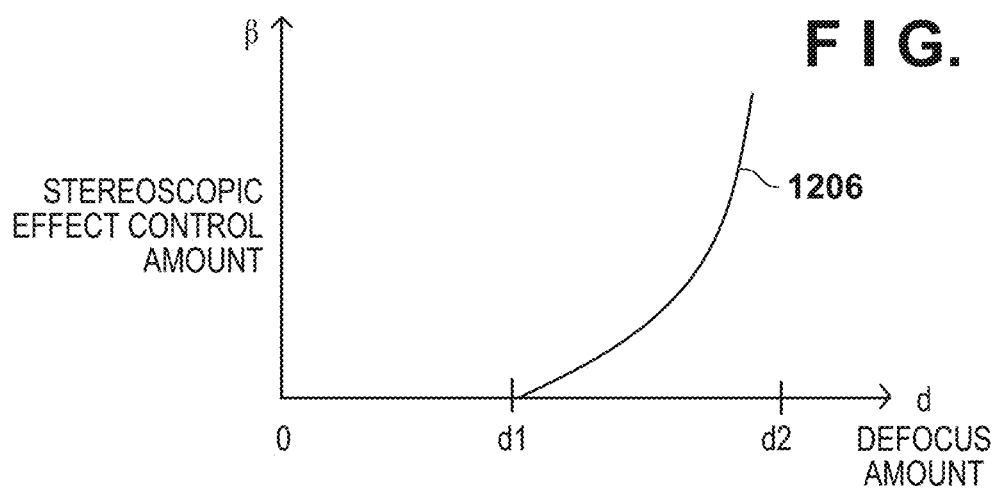

Thus far, a method of increasing the sharpness of a tolerably in-focus region by using sharpness processing was described as stereoscopic effect control processing, but a method of obtaining an image with a stereoscopic effect by reducing the sharpness of a non-focused region by using a filter that causes the image to be blurred may be employed. By reducing the sharpness of the peripheral region by causing it to be more blurred and thereby increasing the difference with the sharpness of the in-focus region, it is possible to achieve an image with a stereoscopic effect. For example, it is possible to do so by controlling the intensity of a Gaussian filter according to a stereoscopic effect control amount. At that time, it is possible to achieve an image with a stereoscopic effect by setting the stereoscopic effect control amount to become larger as the defocus amount becomes larger, as illustrated in FIG. 12E and FIG. 12F. Note that it is desirable to consider the brightness of a region in the periphery of the in-focus region even in the case where a filter for blurring the image is applied to a non-focused region in this way. As described above, the viewer perceives a stereoscopic effect in an image due to the difference in sharpness in the image. Accordingly, in the case of employing a filter for blurring, a stereoscopic effect control amount set in a case where the average luminance value of a peripheral region is higher than the average luminance value of a tolerably in-focus region is set to be smaller than a stereoscopic effect control amount set in a case where the average luminance value of a peripheral region is lower than the average luminance value of a tolerably in-focus region.

Note that a filter used in the sharpness processing, in addition to being a Laplacian of Gaussian filter, may be something that controls the strength of a specific filter by a sharpness control amount. Here, the specific filter is a filter that is generated to calculate a reverse characteristic of a characteristic indicating deteriorated sharpness information of an output apparatus, for example.

Also, in the present embodiment, an example of sharpness processing was described as processing for controlling sharpness above, but this may be contrast processing. A luminance conversion is performed so that the contrast of luminance values of respective pixels in input image data of a tolerably in-focus region including an in-focus region becomes higher. A method of using a conversion formula where the sharpness control amount is made to be a coefficient and a method of enhancing the contrast by equalizing a histogram generated from the luminance values of respective pixels of the input image data may be used for the luminance conversion, but there is no limitation to these if it is possible to control the contrast. Since it is possible to control the sharpness of the output image by sharpness processing and contrast processing, either of these processes, or a combination of these processes may be executed in accordance with the characteristics of the output apparatus 102.

[Image Processing Condition]

A method of generating the image processing condition 405 in the stereoscopic effect control processing will be described. Firstly, a measurement chart as illustrated in FIG. 13, for example, is outputted by the output apparatus 102 which may be a printer, a display, a projector, or the like. After that, a frequency characteristic (MTF) of an image resulting from applying the previously-described contrast sensitivity characteristic to the output image of the output apparatus 102 obtained using a measurement apparatus (not shown) is calculated. Also, a method of calculating an MTF characteristic of an image resulting from applying a visual contrast sensitivity characteristic to an image obtained by simulating on a PC respective image processes in output image generation.

The image illustrated in FIG. 13 is configured to include a group of images 1301 corresponding to a focal plane that is in-focus, and a group of a plurality of images 1302 represented by blurring corresponding to a blurring amount of an input image for a specific defocus amount 205. In more detail, it is a chart that includes a plurality of rectangular patterns or sinusoidal patterns with different spatial frequencies and uniform patterns 1303 and 1304. Note that what is illustrated in FIG. 13 is pluralities 1301 and 1302 of sinusoidal patterns with different spatial frequencies. The uniform patterns are configured to include a maximum pixel value and a minimum pixel value on the sinusoidal pattern.

Figure 14:
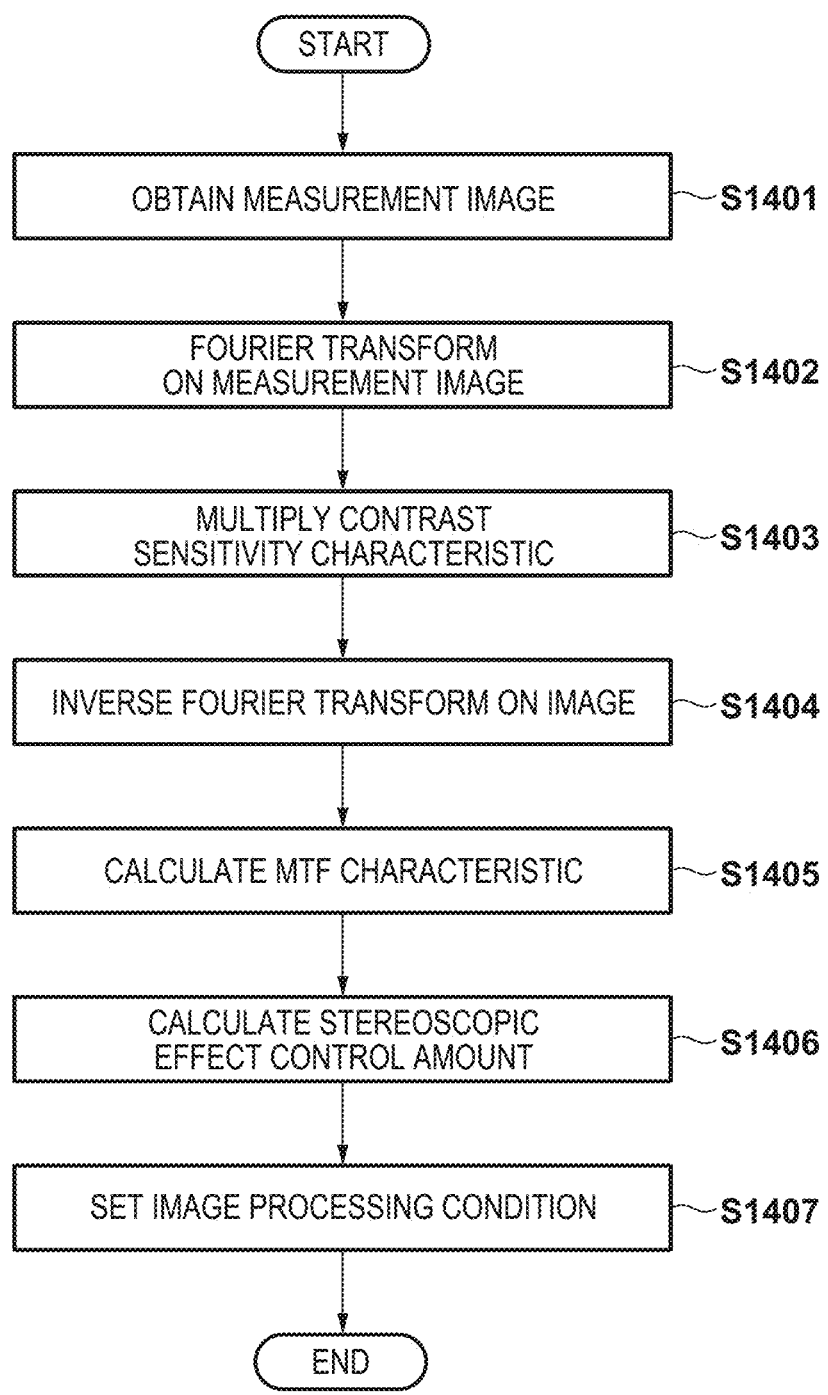
FIG. 14 is a flowchart illustrating image output condition setting processing.

A method for generating the image processing condition 405 will be described with reference to the flowchart of FIG. 14. Firstly, the measurement chart illustrated in FIG. 13 is obtained (chart output, step S1401). The contrast sensitivity characteristic is applied to the obtained measurement image of the measurement chart. By multiplying a contrast characteristic with the spatial frequency characteristic resulting from performing a Fourier transform on the measurement image, the contrast sensitivity characteristic is applied (step S1402, step S1403), an inverse Fourier transform is performed on the result of that, and thereby an image for MTF calculation is obtained (step S1404). Next, an image MTF characteristic is calculated (step S1405) from the image for MTF calculation. In the case where the measurement image is of a sinusoidal pattern, the MTF characteristic is calculated by Equation (6) or Equation (7) in the present embodiment. This value is an absolute value of an optical transfer function. In the case where the average brightness of the output image changes, Equation (7) may be used. The values R1 and R2 in Equation (6) and Equation (7) are reflectances, but luminance, density, or device RGB values may be used. When the output apparatus 102 is a printer, a scanner, a digital camera, or a microscope may be used as the measurement apparatus (not shown), for example, and when the output apparatus 102 is a display or a projector, a digital camera may be used.

$$MTF(u)=C(u)/C' \qquad (6)$$

u is a sinusoidal frequency $C(u)=[Max(u)-Min(u)]/[Max(u)+Min(u)]$ $C'=(R1-R2)/(R1+R2)$ Max(u) is a maximum reflectance of a sinusoidal pattern that changes with the frequency Min(u) is a minimum reflectance of a sinusoidal pattern that changes with the frequency R1 and R2 are reflectances of the uniform patterns (R1>R2)

$$MTF(u)=[Max(u)-Min(u)]/[R1-R2] \qquad (7)$$

Also, in the case of a rectangular wave pattern, the MTF characteristic of the output apparatus 102 is expressed by a contrast transfer function (CTF) obtained by applying Equation (6) or Equation (7). Also, an MTF value resulting from converting a CTF value by a Coltman correction formula may be used.

By the previously-described method, a frequency characteristic (MTF characteristic) of an image resulting from applying the contrast sensitivity characteristic to the respective images of the group of images 1301 corresponding to the focal plane and the group of images 1302 corresponding to a specific defocus amount included in the measurement chart is obtained.

Accordingly, it is possible to obtain the MTF characteristic for each defocus amount 205. In other words, a characteristic related to sharpness is obtained for each defocus amount 205 for which the contrast sensitivity characteristic is applied. Meanwhile, in order to obtain an output image with an appropriate stereoscopic effect, it is necessary that compared to when the stereoscopic effect control processing is not applied, the difference in sharpness between a tolerably in-focus region and a non-tolerably in-focus region of an output image when the processing is applied is closer to the difference in sharpness between the tolerably in-focus region and the non-tolerably in-focus region in the input image. In other words, in order to appropriately control the difference in sharpness between the tolerably in-focus region and the non-tolerably in-focus region in the processed image, configuration may be taken to set a sharpness control amount in accordance with a characteristic related to the sharpness for each defocus amount 205 for which the contrast sensitivity is applied. For example, the stereoscopic effect control amount is set (step S1406) so as to restore, by the sharpening processing, the sharpness or frequency characteristic of the in-focus region of a processed image in the specific spatial frequency to the sharpness or frequency characteristic of the input image.

Similarly, a restoration amount is calculated from the MTF characteristic obtained for each defocus amount for a non-focused region as well and made to be the stereoscopic effect control amount. Accordingly, the stereoscopic effect control amount corresponding to the defocus amount 205 illustrated in FIGS. 12A to 12F is calculated. In the present embodiment, as illustrated in FIG. 12A, the stereoscopic effect control amount of the in-focus region is 0, but in the case where there is a change in the characteristic of the sharpness of the in-focus region, the control amount therefor may be a value corresponding to the change rather than 0.

The method of defining the relationship between defocus amount and sharpness as the image processing condition 405 may be a method of setting as a relationship expression whose input is the defocus amount 205 and whose output is the sharpness control amount and may be a method of selecting and setting parameters by an LUT method. Of course, limitation is not made to this, and any method may be used if it is possible to calculate the sharpness control amount corresponding to the defocus amount 205.

By satisfying the condition that the difference in sharpness in the case where the sharpening processing according to the image processing condition 405 is closer to the difference in the sharpness in the input image data than the difference in sharpness in the case where the processing is not performed, an output image with an appropriate stereoscopic effect is achieved. Accordingly, the stereoscopic effect control amount is not limited to a value that restores an MTF characteristic if it is a value that satisfies the foregoing condition.

By the method described above, a stereoscopic effect control amount is derived (step S1406) from a characteristic that affects the sharpness of each defocus amount 205 for which the contrast sensitivity characteristic is applied. By processing the input image data based on this, it becomes possible to control the stereoscopic effect in the output image.

The present embodiment described an example of a relationship between the defocus amount 205 for which the contrast sensitivity characteristic is applied and the stereoscopic effect control amount as the image processing condition 405. The image processing condition 405 is not limited to this, and may be a relationship between the image shift amount 206, which is information corresponding to a distance from the focal plane, or the distance 304 between the focal plane and an object, and a stereoscopic effect control amount.

The image processing condition 405 derived from the output characteristic related to the sharpness of the output apparatus 102 according to the defocus amount 205 as described above is set (step S1407). By processing the input image data based on the set image processing condition 405, it becomes possible to control the stereoscopic effect in the output image.

Also, in the embodiment described above, a configuration in which data captured by an image capturing apparatus such as a camera is used as image data in a photographic image and a defocus amount at a time of capture is used as information corresponding to the distance from the focal plane was described. However, when a photographic image obtained by capturing is edited using software for image editing, and a focal position is corrected, there are cases where the focus amount for each region in the image changes. In such a case, the image data after correction and the defocus amount after the change may be used. Also, configuration may be taken so as to not obtain the focus amount on the image capturing apparatus side but to analyze a captured image with software for image editing, and to obtain the focus amount by such analysis.

The data and information are not limited. For example, data of a photographic image created by modeling, rendering, image editing software, or the like, and information equivalent to a distance from the focal plane that is created by software corresponding to the image data can also be used. In such software, there are cases where blur information of an image is generated using a map which is information corresponding to the distance from the focal plane.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-025348, filed Feb. 15, 2018 and No. 2019-015988, filed Jan. 31, 2019, which are hereby incorporated by reference herein in their entirety.

What is claimed is:

1. An image processing apparatus comprising:
   at least one processor, which executes instructions stored in at least one memory, being configured to:
   (1) input image data for outputting a photographic image by an output apparatus; and
   (2) execute processing that controls a sharpness of an image in relation to data of each pixel of the image data based on (a) distance information related to a distance from a focal plane corresponding to the image data and (b) luminance information of each pixel of the image data, wherein in the executing of the processing, the at least one processor sets a sharpness control amount corresponding to an in-focus region that is determined to be in-focus in the image, such that, in a case where an average luminance of a peripheral region that neighbors the in-focus region is higher than an average luminance of the in-focus region, the sharpness control amount corresponding to the in-focus region becomes larger than in a case where the average luminance of the peripheral region is smaller than the average luminance of the in-focus region.

2. The image processing apparatus according to claim 1, wherein the distance information includes a defocus amount.

3. The image processing apparatus according to claim 2, wherein, in a case where the average luminance of the peripheral region is higher than the average luminance of the in-focus region, the at least one processor controls the sharpness control amount corresponding to the peripheral region to become smaller than in a case where the average luminance of the peripheral region is smaller than the average luminance of the in-focus region.

4. The image processing apparatus according to claim 1, wherein a relative relationship for sharpness between the in-focus region and the peripheral region in image data for which a sharpness control was performed by the least one processor is closer to a relative relationship for sharpness between the in-focus region and the peripheral region in the inputted image data than in image data for which the sharpness control was not performed by the at least one processor.

5. The image processing apparatus according to claim 1, wherein the at least one processor is further configured to:
(1) output a first measurement chart that corresponds to a specific defocus amount and that includes a plurality of patterns that correspond to a plurality of spatial frequencies; and
(2) obtain the sharpness control amount based on the outputted first measurement chart, and
wherein the at least one processor, by using the obtained sharpness control amount, controls the sharpness of the image that the inputted image data represents.

6. The image processing apparatus according to claim 5, wherein the at least one processor calculates a Modulation Transfer Function characteristic from the outputted first measurement chart, and obtains as the sharpness control amount, a sharpness restoration amount obtained based on the characteristic.

7. The image processing apparatus according to claim 5, wherein the at least one processor is further configured to:
(1) based on a second measurement chart including a plurality of patterns in which peripheral regions having a plurality of luminances are associated with a region corresponding to the in-focus region, obtain a contrast sensitivity characteristic based on an amount of change in apparent brightness of the region of the second measurement chart, and
wherein the at least one processor obtains the sharpness control amount based on the outputted first measurement chart and the obtained contrast sensitivity characteristic.

8. The image processing apparatus according to claim 1, wherein the sharpness control by the at least one processor includes at least either sharpness processing or contrast processing.

9. The image processing apparatus according to claim 1, wherein the image data for the photographic image is obtained by capturing a subject.

10. The image processing apparatus according to claim 1, wherein the focal plane is a focal plane at a time of capturing a subject.

11. The image processing apparatus according to claim 1, wherein output by the output apparatus includes at least either printing or displaying.

12. An image processing method comprising:
inputting image data of a photographic image;
based on (a) distance information related to a distance from a focal plane in the photographic image and (b) luminance information of each pixel of the image data, controlling a sharpness of an image that the inputted image data represents; and
outputting image data resulting from the sharpness control being performed,
wherein the controlling comprises setting a sharpness control amount corresponding to an in-focus region that is determined to be in-focus in the image, such that, in a case where an average luminance of a peripheral region that neighbors the in-focus region is higher than an average luminance of the in-focus region, the sharpness control amount corresponding to the in-focus region becomes larger than in a case where the average luminance of the peripheral region is smaller than the average luminance of the in-focus region.

13. A non-transitory computer-readable storage medium storing a computer program that causes a computer to:
(1) input image data of a photographic image;
(2) based on (a) distance information related to a distance from a focal plane in the photographic image and (b) luminance information of each pixel of the image data, control a sharpness of an image that the inputted image data represents; and
(3) output image data resulting from the sharpness control being performed,
wherein the control comprises setting a sharpness control amount corresponding to an in-focus region that is determined to be in-focus in the image, such that, in a case where an average luminance of a peripheral region that neighbors the in-focus region is higher than an average luminance of the in-focus region, the sharpness control amount corresponding to the in-focus region becomes larger than in a case where the average luminance of the peripheral region is smaller than the average luminance of the in-focus region.

14. An image processing apparatus comprising:
at least one processor, which executes instructions stored in at least one memory, being configured to:
(1) input image data for outputting a photographic image by an output apparatus; and
(2) execute processing that controls a sharpness of an image in relation to data of each pixel of the image data based on (a) distance information related to a distance from a focal plane corresponding to the image data and (b) luminance information of each pixel of the image data,
wherein in the executing of the processing, the at least one processor sets a sharpness control amount corresponding to a peripheral region that neighbors an in-focus region that is determined to be in-focus in the image such that, in a case where an average luminance of the peripheral region is higher than an average luminance of the in-focus region, sharpness control amount corresponding to the peripheral region becomes smaller than in a case where the average luminance of the peripheral region is smaller than the average luminance of the in-focus region.

15. The image processing apparatus according to claim 14, wherein the distance information includes a defocus amount.

16. The image processing apparatus according to claim 14, wherein the sharpness control by the at least one processor is processing that causes an image to be blurred.

17. An image processing apparatus comprising:
at least one processor, which executes instructions stored in at least one memory, being configured to:
(1) input image data for outputting a photographic image by an output apparatus;
(2) execute processing that controls a sharpness of an image in relation to data of each pixel of the image data, based on distance information related to a distance from a focal plane corresponding to the image data in order to make a stereoscopic effect that a viewer who views the photographic image outputted by the output apparatus perceives closer to a stereoscopic effect that the inputted image data has;
(3) output a first measurement chart that corresponds to a specific defocus amount and that includes a plurality of patterns that correspond to a plurality of spatial frequencies; and
(4) obtain a sharpness control amount based on the outputted first measurement chart,
wherein the at least one processor, in accordance with a luminance of a peripheral region that neighbors an in-focus region that is determined to be in-focus in the image, sets the sharpness control amount corresponding to the in-focus region, and
wherein the at least one processor, by using the obtained sharpness control amount, controls the sharpness of the image that the inputted image data represents.

18. The image processing apparatus according to claim 1, wherein the at least one processor executes the processing that controls the sharpness of the image in relation to data of each pixel of the image data, in order to make a stereoscopic effect that a viewer who views the photographic image outputted by the output apparatus perceives closer to a stereoscopic effect that the inputted image data has.

19. The image processing apparatus according to claim 1, wherein the at least one processor, in accordance with an amount of change in apparent brightness of the in-focus region that is determined to be in-focus in the image based on the distance information, sets the sharpness control amount corresponding to the in-focus region, and
wherein the amount of change is caused by a difference between the average luminance of the in-focus region and the average luminance of the peripheral region that neighbors the in-focus region.

20. The image processing apparatus according to claim 14, wherein the at least one processor executes the processing that controls the sharpness of the image in relation to data of each pixel of the image data, in order to make a stereoscopic effect that a viewer who views the photographic image outputted by the output apparatus perceives closer to a stereoscopic effect that the inputted image data has.

21. The image processing apparatus according to claim 14, wherein the at least one processor, in accordance with an amount of change in apparent brightness of the in-focus region that is determined to be in-focus in the image based on the distance information, sets the sharpness control amount corresponding to the peripheral region, and
wherein the amount of change is caused by a difference between the average luminance of the in-focus region and the average luminance of the peripheral region that neighbors the in-focus region.

* * * * *